United States Patent
Rehbein et al.

(10) Patent No.: US 12,478,496 B2
(45) Date of Patent: Nov. 25, 2025

(54) NEGATIVE PRESSURE THERAPY SYSTEM WITH HEAT-MOLDABLE SPLINT

(71) Applicant: KCI Manufacturing Unlimited Company, Westmeath (IE)

(72) Inventors: Jonathan G. Rehbein, San Antonio, TX (US); Larry Tab Randolph, San Antonio, TX (US); Ronald W. Ausen, San Antonio, TX (US); Matthew T. Scholz, San Antonio, TX (US)

(73) Assignee: KCI Manufacturing Unlimited Company, Westmeath (IE)

( * ) Notice: Subject to any disclaimer, the term of this patent is extended or adjusted under 35 U.S.C. 154(b) by 272 days.

(21) Appl. No.: 18/266,589

(22) PCT Filed: Dec. 7, 2021

(86) PCT No.: PCT/IB2021/061406
§ 371 (c)(1),
(2) Date: Jun. 12, 2023

(87) PCT Pub. No.: WO2022/144637
PCT Pub. Date: Jul. 7, 2022

(65) Prior Publication Data
US 2024/0041632 A1 Feb. 8, 2024

Related U.S. Application Data

(60) Provisional application No. 63/132,343, filed on Dec. 30, 2020.

(51) Int. Cl.
*A61F 5/00* (2006.01)
*A61F 5/058* (2006.01)

(52) U.S. Cl.
CPC .................................. *A61F 5/0585* (2013.01)

(58) Field of Classification Search
None
See application file for complete search history.

(56) References Cited

U.S. PATENT DOCUMENTS

| | | |
|---|---|---|
| 1,355,846 A | 10/1920 | Rannells |
| 2,547,758 A | 4/1951 | Keeling |

(Continued)

FOREIGN PATENT DOCUMENTS

| | | |
|---|---|---|
| AU | 550575 B2 | 3/1986 |
| AU | 745271 B2 | 3/2002 |

(Continued)

OTHER PUBLICATIONS

International Search Report/Written Opinion for PCT International Application No. PCT/IB2021/061406, mailed Apr. 26, 2022.

(Continued)

*Primary Examiner* — Kim M Lewis

(57) ABSTRACT

A kit (1500) for negative pressure and immobilization therapy includes a negative pressure dressing (100) configured to define a sealed volume between a patient's skin and the negative pressure dressing when applied to the patient, a pump (200) configured to be placed in pneumatic communication with the negative pressure dressing and operable to displace air from the sealed volume, and a heat-moldable splint (900). The heat-moldable splint includes a plurality of flexible tubes formed of a first material and coupled together to form a web and a second material positioned in the flexible tubes and having a lower softening or melting point than the first material.

20 Claims, 20 Drawing Sheets

(56) References Cited

U.S. PATENT DOCUMENTS

| | | | |
|---|---|---|---|
| 2,632,443 A | 3/1953 | Lesher | |
| 2,682,873 A | 7/1954 | Evans et al. | |
| 2,910,763 A | 11/1959 | Lauterbach | |
| 2,969,057 A | 1/1961 | Simmons | |
| 3,066,672 A | 12/1962 | Crosby, Jr. et al. | |
| 3,367,332 A | 2/1968 | Groves | |
| 3,520,300 A | 7/1970 | Flower, Jr. | |
| 3,568,675 A | 3/1971 | Harvey | |
| 3,648,692 A | 3/1972 | Wheeler | |
| 3,682,180 A | 8/1972 | McFarlane | |
| 3,826,254 A | 7/1974 | Mellor | |
| 3,990,437 A * | 11/1976 | Boyden, Jr. | A61F 5/04 602/8 |
| 4,080,970 A | 3/1978 | Miller | |
| 4,096,853 A | 6/1978 | Weigand | |
| 4,139,004 A | 2/1979 | Gonzalez, Jr. | |
| 4,165,748 A | 8/1979 | Johnson | |
| 4,184,510 A | 1/1980 | Murry et al. | |
| 4,233,969 A | 11/1980 | Lock et al. | |
| 4,245,630 A | 1/1981 | Lloyd et al. | |
| 4,256,109 A | 3/1981 | Nichols | |
| 4,261,363 A | 4/1981 | Russo | |
| 4,275,721 A | 6/1981 | Olson | |
| 4,284,079 A | 8/1981 | Adair | |
| 4,297,995 A | 11/1981 | Golub | |
| 4,333,468 A | 6/1982 | Geist | |
| 4,373,519 A | 2/1983 | Errede et al. | |
| 4,382,441 A | 5/1983 | Svedman | |
| 4,392,853 A | 7/1983 | Muto | |
| 4,392,858 A | 7/1983 | George et al. | |
| 4,419,097 A | 12/1983 | Rowland | |
| 4,465,485 A | 8/1984 | Kashmer et al. | |
| 4,475,909 A | 10/1984 | Eisenberg | |
| 4,480,638 A | 11/1984 | Schmid | |
| 4,483,332 A | 11/1984 | Rind | |
| 4,525,166 A | 6/1985 | Leclerc | |
| 4,525,374 A | 6/1985 | Vaillancourt | |
| 4,540,412 A | 9/1985 | Van Overloop | |
| 4,543,100 A | 9/1985 | Brodsky | |
| 4,548,202 A | 10/1985 | Duncan | |
| 4,551,139 A | 11/1985 | Plaas et al. | |
| 4,569,348 A | 2/1986 | Hasslinger | |
| 4,605,399 A | 8/1986 | Weston et al. | |
| 4,608,041 A | 8/1986 | Nielsen | |
| 4,617,921 A * | 10/1986 | Seeler | A61F 13/04 602/7 |
| 4,640,688 A | 2/1987 | Hauser | |
| 4,655,754 A | 4/1987 | Richmond et al. | |
| 4,664,662 A | 5/1987 | Webster | |
| 4,710,165 A | 12/1987 | McNeil et al. | |
| 4,733,659 A | 3/1988 | Edenbaum et al. | |
| 4,743,232 A | 5/1988 | Kruger | |
| 4,758,220 A | 7/1988 | Sundblom et al. | |
| 4,787,888 A | 11/1988 | Fox | |
| 4,826,494 A | 5/1989 | Richmond et al. | |
| 4,838,883 A | 6/1989 | Matsuura | |
| 4,840,187 A | 6/1989 | Brazier | |
| 4,863,449 A | 9/1989 | Therriault et al. | |
| 4,872,450 A | 10/1989 | Austad | |
| 4,878,901 A | 11/1989 | Sachse | |
| 4,897,081 A | 1/1990 | Poirier et al. | |
| 4,906,233 A | 3/1990 | Moriuchi et al. | |
| 4,906,240 A | 3/1990 | Reed et al. | |
| 4,919,654 A | 4/1990 | Kalt | |
| 4,941,882 A | 7/1990 | Ward et al. | |
| 4,953,565 A | 9/1990 | Tachibana et al. | |
| 4,969,880 A | 11/1990 | Zamierowski | |
| 4,985,019 A | 1/1991 | Michelson | |
| 5,037,397 A | 8/1991 | Kalt et al. | |
| 5,086,170 A | 2/1992 | Luheshi et al. | |
| 5,092,858 A | 3/1992 | Benson et al. | |
| 5,100,396 A | 3/1992 | Zamierowski | |
| 5,134,994 A | 8/1992 | Say | |
| 5,149,331 A | 9/1992 | Ferdman et al. | |
| 5,167,613 A | 12/1992 | Karami et al. | |
| 5,176,663 A | 1/1993 | Svedman et al. | |
| 5,215,522 A | 6/1993 | Page et al. | |
| 5,232,453 A | 8/1993 | Plass et al. | |
| 5,261,893 A | 11/1993 | Zamierowski | |
| 5,278,100 A | 1/1994 | Doan et al. | |
| 5,279,550 A | 1/1994 | Habib et al. | |
| 5,298,015 A | 3/1994 | Komatsuzaki et al. | |
| 5,342,376 A | 8/1994 | Ruff | |
| 5,344,415 A | 9/1994 | DeBusk et al. | |
| 5,358,494 A | 10/1994 | Svedman | |
| 5,437,622 A | 8/1995 | Carion | |
| 5,437,651 A | 8/1995 | Todd et al. | |
| 5,527,293 A | 6/1996 | Zamierowski | |
| 5,549,584 A | 8/1996 | Gross | |
| 5,556,375 A | 9/1996 | Ewall | |
| 5,607,388 A | 3/1997 | Ewall | |
| 5,636,643 A | 6/1997 | Argenta et al. | |
| 5,645,081 A | 7/1997 | Argenta et al. | |
| 5,921,945 A | 7/1999 | Gray | |
| 6,071,267 A | 6/2000 | Zamierowski | |
| 6,074,354 A | 6/2000 | Scholz et al. | |
| 6,132,835 A | 10/2000 | Scholz et al. | |
| 6,135,116 A | 10/2000 | Vogel et al. | |
| 6,241,747 B1 | 6/2001 | Ruff | |
| 6,287,316 B1 | 9/2001 | Agarwal et al. | |
| 6,345,623 B1 | 2/2002 | Heaton et al. | |
| 6,488,643 B1 | 12/2002 | Tumey et al. | |
| 6,493,568 B1 | 12/2002 | Bell et al. | |
| 6,553,998 B2 | 4/2003 | Heaton et al. | |
| 6,814,079 B2 | 11/2004 | Heaton et al. | |
| 7,846,141 B2 | 12/2010 | Weston | |
| 8,062,273 B2 | 11/2011 | Weston | |
| 8,216,198 B2 | 7/2012 | Heagle et al. | |
| 8,251,979 B2 | 8/2012 | Malhi | |
| 8,257,327 B2 | 9/2012 | Blott et al. | |
| 8,398,614 B2 | 3/2013 | Blott et al. | |
| 8,449,509 B2 | 5/2013 | Weston | |
| 8,529,548 B2 | 9/2013 | Blott et al. | |
| 8,535,296 B2 | 9/2013 | Blott et al. | |
| 8,551,060 B2 | 10/2013 | Schuessler et al. | |
| 8,568,386 B2 | 10/2013 | Malhi | |
| 8,657,796 B2 * | 2/2014 | Marasco | A61B 90/40 604/289 |
| 8,679,081 B2 | 3/2014 | Heagle et al. | |
| 8,834,451 B2 | 9/2014 | Blott et al. | |
| 8,926,592 B2 | 1/2015 | Blott et al. | |
| 9,017,302 B2 | 4/2015 | Vitaris et al. | |
| 9,198,801 B2 | 12/2015 | Weston | |
| 9,211,365 B2 | 12/2015 | Weston | |
| 9,289,542 B2 | 3/2016 | Blott et al. | |
| 2002/0077661 A1 | 6/2002 | Saadat | |
| 2002/0115951 A1 | 8/2002 | Norstrem et al. | |
| 2002/0120185 A1 | 8/2002 | Johnson | |
| 2002/0143286 A1 | 10/2002 | Tumey | |
| 2014/0163491 A1 | 6/2014 | Schuessler et al. | |
| 2015/0025431 A1 | 1/2015 | Liden et al. | |
| 2015/0080788 A1 | 3/2015 | Blott et al. | |
| 2020/0253788 A1 | 8/2020 | Rehbein et al. | |

FOREIGN PATENT DOCUMENTS

| | | |
|---|---|---|
| AU | 755496 B2 | 12/2002 |
| CA | 2005436 A1 | 6/1990 |
| DE | 26 40 413 A1 | 3/1978 |
| DE | 43 06 478 A1 | 9/1994 |
| DE | 29 504 378 U1 | 9/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 A1 | 7/2000 |
| GB | 692578 A | 6/1953 |
| GB | 2195255 A | 4/1988 |
| GB | 2 197 789 A | 6/1988 |
| GB | 2 220 357 A | 1/1990 |
| GB | 2 235 877 A | 3/1991 |
| GB | 2 329 127 A | 3/1999 |
| GB | 2 333 965 A | 8/1999 |
| JP | 4129536 B2 | 8/2008 |

(56) References Cited

FOREIGN PATENT DOCUMENTS

| | | |
|---|---|---|
| KR | 101538645 B1 | 7/2015 |
| SG | 71559 | 4/2002 |
| WO | 80/02182 A1 | 10/1980 |
| WO | 87/04626 A1 | 8/1987 |
| WO | 90/010424 A1 | 9/1990 |
| WO | 93/009727 A1 | 5/1993 |
| WO | 94/20041 A1 | 9/1994 |
| WO | 96/05873 A1 | 2/1996 |
| WO | 97/18007 A1 | 5/1997 |
| WO | 99/13793 A1 | 3/1999 |
| WO | 2020170115 A1 | 8/2020 |
| WO | 2020226759 A1 | 11/2020 |

OTHER PUBLICATIONS

Extended European Search Report for corresponding application 23219187.4, dated Apr. 4, 2024.
Louis C. Argenta, MD and Michael J. Morykwas, Phd; Vacuum-Assisted Closure: A New Method for Wound Control and Treatment: Clinical Experience; Annals of Plastic Surgery; vol. 38, No. 6, Jun. 1997; pp. 563-576.
Susan Mendez-Eatmen, RN; "When wounds Won't Heal" RN Jan. 1998, vol. 61 (1); Medical Economics Company, Inc., Montvale, NJ, USA; pp. 20-24.
James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.
John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.
S.E. Greer, et al. "The Use of Subatmospheric Pressure Dressing Therapy to Close Lymphocutaneous Fistulas of the Groin" British Journal of Plastic Surgery (2000), 53, pp. 484-487.
George V. Letsou, MD., et al; "Stimulation of Adenylate Cyclase Activity in Cultured Endothelial Cells Subjected to Cyclic Stretch"; Journal of Cardiovascular Surgery, 31, 1990, pp. 634-639.
Orringer, Jay, et al; "Management of Wounds in Patients with Complex Enterocutaneous Fistulas"; Surgery, Gynecology & Obstetrics, Jul. 1987, vol. 165, pp. 79-80.
International Search Report for PCT International Application PCT/GB95/01983; Nov. 23, 1995.
PCT International Search Report for PCT International Application PCT/GB98/02713; Jan. 8, 1999.
PCT Written Opinion; PCT International Application PCT/GB98/02713; Jun. 8, 1999.
PCT International Examination and Search Report, PCT International Application PCT/GB96/02802; Jan. 15, 1998 & Apr. 29, 1997.
PCT Written Opinion, PCT International Application PCT/GB96/02802; Sep. 3, 1997.
Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.
Kostyuchenok, B.M., et al; "Vacuum Treatment in the Surgical Management of Purulent Wounds"; Vestnik Khirurgi, Sep. 1986, pp. 18-21 and 6 page English translation thereof.
Davydov, Yu. A., et al; "Vacuum Therapy in the Treatment of Purulent Lactation Mastitis"; Vestnik Khirurgi, May 14, 1986, pp. 66-70, and 9 page English translation thereof.
Yusupov. Yu.N., et al; "Active Wound Drainage", Vestniki Khirurgi, vol. 138, Issue 4, 1987, and 7 page English translation thereof.
Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.
Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.
Chariker, Mark E., M.D., et al; "Effective Management of incisional and cutaneous fistulae with closed suction wound drainage"; Contemporary Surgery, vol. 34, Jun. 1989, pp. 59-63.
Egnell Minor, Instruction Book, First Edition, 300 7502, Feb. 1975, pp. 24.
Egnell Minor: Addition to the Users Manual Concerning Overflow Protection—Concerns all Egnell Pumps, Feb. 3, 1983, pp. 2.
Svedman, P.: "Irrigation Treatment of Leg Ulcers", The Lancet, Sep. 3, 1983, pp. 532-534.
Chinn, Steven D. et al.: "Closed Wound Suction Drainage", The Journal of Foot Surgery, vol. 24, No. 1, 1985, pp. 76-81.
Arnljots, Björn et al.: "Irrigation Treatment in Split-Thickness Skin Grafting of Intractable Leg Ulcers", Scand J. Plast Reconstr. Surg., No. 19, 1985, pp. 211-213.
Svedman, P.: "A Dressing Allowing Continuous Treatment of a Biosurface", IRCS Medical Science: Biomedical Technology, Clinical Medicine, Surgery and Transplantation, vol. 7, 1979, p. 221.
Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.
N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (copy and certified translation).
K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.
G. Živadinovi?, V. ?uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).
F.E. Johnson, "An Improved Technique for Skin Graft Placement Using a Suction Drain," Surgery, Gynecology, and Obstetrics 159 (1984), pp. 584-585.
A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).
M. Schein, R. Saadia, J.R. Jamieson, and G.A.G. Decker, "The 'Sandwich Technique' in the Management of the Open Abdomen," British Journal of Surgery 73 (1986), pp. 369-370.
D.E. Tribble, An Improved Sump Drain-Irrigation Device of Simple Construction, Archives of Surgery 105 (1972) pp. 511-513.
M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).
C.E. Tennants, "The Use of Hypermia in the Postoperative Treatment of Lesions of the Extremities and Thorax," Journal of the American Medical Association 64 (1915), pp. 1548-1549.
Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.
V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").
V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").
V.A. Solovev, Dissertation Abstract, Treatment and Prevention of Suture Failures after Gastric Resection (S.M. Kirov Gorky State Medical Institute, Gorky, U.S.S.R. 1968) ("Solovev Abstract").

(56) References Cited

OTHER PUBLICATIONS

V.A.C.® Therapy Clinical Guidelines: A Reference Source for Clinicians; Jul. 2007.

* cited by examiner

| Substrate | Performance Improvement (compared to reticulated foam) | Description | Materials Composition | Weight | Thickness (inch) | Yarn Description (body) | | Yarn Description (intermediate layer) | |
|---|---|---|---|---|---|---|---|---|---|
| | | | | | | # of filaments | Denier per filament | # of filaments | Denier per filament |
| FIG. 6A | 10.49% | High density/stiffness upper layer and lower layer | 100% Polyester | 22.3 | 0.25 | 100 | 3.4 | | 209.1 |
| FIG. 6B | 7.68% | Low density/stiffness upper layer and lower layer | 100% Polyester | 10.2 | 0.17 | 138 | 1.5 | | 37.7 |
| FIG. 6C | 24.6% | High density/stiffness upper layer; Low density/stiffness lower layer | 100% Polyester | 9.4 | 0.12 | 36 | 2.4 | | 32.9 |
| FIG. 6D | -16.06% | Discontinuous high density/stiffness upper layer; Continuous low density/stiffness lower layer | 100% Polyester | 12.5 | 0.15 | 46 | 5.5 | 1 (monofilament) | 107.9 |
| FIG. 6E | 51.23% | Multilayer | 100% Polyester (bonded with co-polyamide adhesive) | 33 | 0.42 | Combination of decompression layers of FIG. 6A and FIG. 6B | | | |

FIG. 7

NEGATIVE PRESSURE THERAPY SYSTEM WITH HEAT-MOLDABLE SPLINT

CROSS-REFERENCE TO RELATED APPLICATIONS

This application claims the benefit of priority to U.S. Provisional Application No. 63/132,343, filed on Dec. 30, 2020, which is incorporated herein by reference in its entirety.

BACKGROUND

Swelling associated with trauma or certain pathologies (e.g. lymphedema) may cause various medical complications. For example, swelling can cause discomfort and pain, may limit range of motion, or otherwise negatively impact patient quality of life. Swelling may also limit the ability of a medical provider to medically image, view, access underlying tissue, or may otherwise interfere in the treatment of a patient, and thus may pose an impediment to the healing and recovery of the patient. In certain circumstances, swelling may lead to even more severe consequences, such as, e.g., atrophy of surrounding muscle tissue. It would be advantageous to provide a system which could help reduce swelling at a tissue site, for example by providing decompression therapy to increase blood perfusion and lymphatic flow at a tissue site to reduce swelling at the tissue site. In some clinical scenarios, immobilization of the tissue site (e.g., of a joint) may also be desirable in coordination with decompression therapy to improve patient outcomes. Coordinated treatment for both immobilization and swelling reduction may be challenging.

SUMMARY

One implementation of the present disclosure is a splint. The splint includes a plurality of flexible tubes formed of a first material. The plurality of flexible tubes are coupled together to form a web. The splint also includes a second material positioned in the flexible tubes and having a lower softening point than the first material. The web is conformable when the second material is above a softening point of the second material, and the web is rigid when the second material is below the softening point of the second material.

Another implementation of the present disclosure is first thermoplastic polymer and the second material is a second thermoplastic polymer. In some embodiments, the second material includes polycaprolactone.

In some embodiments, the splint also includes a backing layer coupled to the web. The splint may also include connection features coupled to the splint. The connection features are configured to couple the splint to a dressing.

In some embodiments, the web includes spacer segments between adjacent tubes of the plurality of flexible tubes. The flexible tubes may be in two or planes. In some embodiments, the flexible tubes may be aligned in a shared plane. In some embodiments, a cross-section of each of the flexible tubes has a non-circular shape. Adjacent tubes of the plurality of flexible tubes may be periodically joined together at bond regions with spaces between the adjacent tubes of the plurality of flexible tubes between the bond regions.

Another implementation of the present disclosure is a kit for negative pressure and immobilization therapy. The kit includes a negative pressure dressing configured to define a sealed volume between a patient's skin and the negative pressure dressing when applied to the patient, a pump configured to be placed in pneumatic communication with the negative pressure dressing and operable to displace air from the sealed volume, and a heat-moldable splint. The heat-moldable splint includes a plurality of flexible tubes formed of a first material and coupled together to form a web and a second material positioned in the flexible tubes and having a lower softening or melting point than the first material.

In some embodiments, the adjacent tubes in the web of the plurality of flexible tubes are periodically bonded together at bond regions and spaced apart between the bond regions. The heat-moldable splint may include spacer segments joining adjacent tubes of the plurality of flexible tubes to form the web.

In some embodiments, the negative pressure dressing includes attachment features configured to selectively couple the heat-moldable splint to the negative pressure dressing. The heat-moldable splint may include a connection layer coupled to the web and configured to be coupled to the attachment features of the negative pressure dressing.

In some embodiments, the negative pressure dressing is shaped to be applied to a patient's ankle. In such embodiments, the heat-moldable splint is configured to be heated into a moldable state to facilitate application of the heat-moldable splint over the negative pressure dressing at the patient's ankle, and to cool to a rigid state to provide immobilization of the patient's ankle when the heat-moldable splint is applied over the negative pressure dressing at the patient's ankle.

Another implementation of the present disclosure is a method of providing negative pressure and immobilization therapy to facilitate joint healing. The method includes sealing a negative pressure dressing over intact skin, operating a pump coupled to the negative pressure dressing to establish a negative pressure between the negative pressure dressing and the intact skin, heating a heat-moldable splint to at least a softening point of a material housed inside flexible tubes of the heat-moldable splint, conforming the heat-moldable splint over the dressing and into a desired splinting configuration, and allowing the heat-moldable splint to rigidify in the desired splinting configuration as the heat-moldable splint cools to an ambient temperature.

In some embodiments, conforming the heat-moldable splint into the desired splinting configuration includes spiraling the heat-moldable splint around and along the dressing. In some embodiments, conforming the heat-moldable splint into the desired splinting configuration includes applying the heat-moldable splint according to a posterior splinting approach. In some embodiments, conforming the heat-moldable splint into the desired splinting configuration includes applying the heat-moldable splint according to a saddle splinting approach.

In some embodiments, allowing the heat-moldable splint to rigidify in the desired splinting configuration includes coupling the heat-moldable splint to the dressing in the desired splinting configuration. Coupling the heat-moldable splint to the dressing in the desired splinting configuration may include applying an attachment feature of the dressing to a connection layer of the heat-moldable splint. Allowing the heat-moldable splint to rigidify in the desired splinting configuration includes holding the splint in the desired splinting configuration may also be accomplished by wrapping with an elastic bandage wrap such as an ACE™ wrap or 3M™ Coban™ wrap.

In some embodiments, the method also includes heating at least a portion of the heat-moldable splint and bending the heat-moldable splint at the dressing to separate the heat-moldable splint from the dressing.

Another implementation of the present disclosure is a therapy system. The therapy system includes a casting tape. The casting tape includes a net comprising an extruded elastomer and tips provided at external surfaces of the net. The tips are formed of polycaprolactone. The tips are configured to combine to form a substantially rigid structure when the casting tape is heated, wrapped around a tissue site to overlap the casting tape, and allowed to cool.

In some embodiments, the therapy system includes a negative pressure dressing configured to define a sealed volume between a patient's skin and the negative pressure dressing when applied to the patient and a pump configured to be placed in pneumatic communication with the negative pressure dressing and operable to displace air from the sealed volume. The casting tape is configured to be applied over the negative pressure dressing.

In some embodiments, the net includes a plurality of straight portions and a plurality of wavy portions. Each wavy portion periodically and alternately connects to two adjacent straight portions of the plurality of straight portions. The tips may be provided along at least a subset of the plurality of straight portions.

In some embodiments, the casting tape has a thickness of approximately one millimeter. The tips may be spaced apart by approximately one millimeter. The tips are configured to combine when heated above a threshold temperature such that the tips melt or soften. In some embodiments, the tips include polycaprolactone. In some embodiments, the tips may include a lubricant material blended with the polycaprolactone. The casting tape may have a lubricant coating. In some embodiments, casting tape includes a water-activated lubricant.

BRIEF DESCRIPTION OF THE DRAWINGS

FIG. 7 is a table illustrating a comparison of the performance of the illustrative decompression layers of FIGS. 6A-6E to the performance of a reticulated foam-based decompression layer during use of a decompression treatment system according to an illustrative embodiment.

DETAILED DESCRIPTION OF ILLUSTRATIVE EMBODIMENTS

Figure 1:
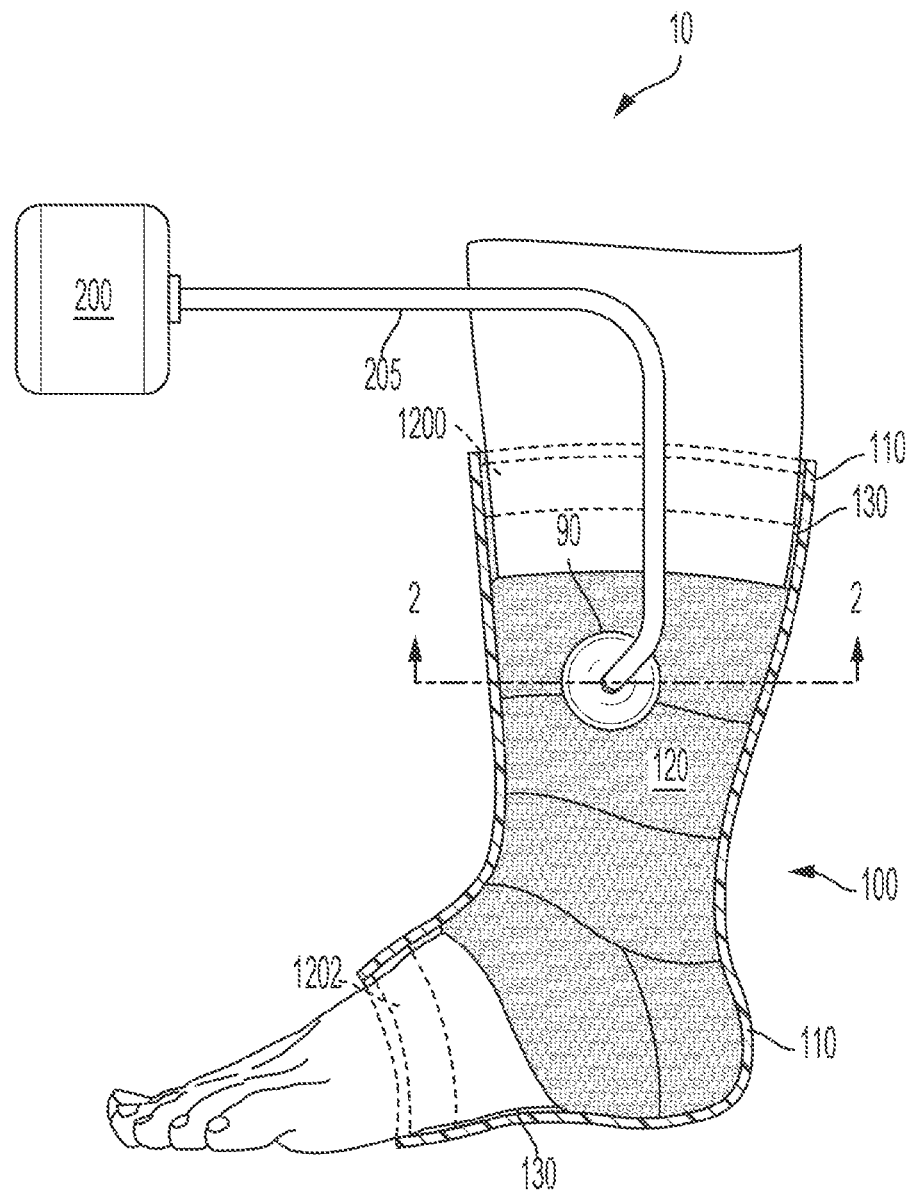
FIG. 1 is side view of a decompression treatment system showing a partial cross-sectional view of a dressing of the decompression treatment system, according to an illustrative embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a decompression therapy treatment system for applying a vacuum (e.g., a negative pressure relative to atmospheric pressure) to intact skin extending over, or surrounding, different types of treatment tissue sites (such as, e.g., bone tissue, adipose tissue, muscle tissue, neural tissue, dermal tissue, vascular tissue, connective tissue, cartilage, tendons, ligaments, etc.) is described according to various embodiments. The application of vacuum to intact skin provided by the treatment system imparts a pulling (e.g., lifting) force to the intact skin, which decompresses the treatment tissue site and thereby increases the perfusion of blood and other fluids (e.g. lymphatic flow, interstitial fluid) at the treatment tissue site.

The decompression of the treatment tissue site resulting from the operation of the treatment system may advantageously be used to reduce swelling at a tissue site. The treatment system is configured for use in both medical and non-medical settings, and may be used to treat swelling occurring as a result of a variety of different conditions. For example, the treatment system may be used in a home setting by a patient to treat swelling resulting from an injury, over-exertion, an underlying medical condition (e.g., lymphedema), etc.

In yet other embodiments, the treatment system may also be used in a medical setting, such as, e.g., to reduce swelling during pre- and/or post-operative care of a patient. For example, reducing swelling at a treatment site (e.g., caused by a broken bone, edema, tissue sprain, tissue strain, etc.) prior to surgery may advantageously facilitate access to underlying tissue at a target surgical site, reduce surgery time and/or improve the outcome of surgical treatment. Use of a treatment system according to any of the embodiments described herein prior to surgical treatment may advantageously decrease the time needed to reduce swelling at the target surgical site to an acceptable degree of swelling as compared to the time that would be required to reduce swelling using conventional methods of treating swelling. For example, use of the treatment system may reduce swelling to an acceptable degree within 3 to 7 days of initiation of treatment using the treatment system.

In addition to the use of the treatment system to reduce swelling, the decompression therapy provided by the treatment system may advantageously also be used in the treatment of a variety of other medical conditions or ailments. As one non-limiting example, the treatment system may be used for the acute treatment of pain and/or inflammation (occurring, e.g., as a result of a sprain or other stress at a tissue site). In yet other situations, the treatment system may be used to increase blood perfusion and/or lymphatic flow at a treatment tissue site to minimize the effects of over-exertion (e.g., following athletic training or other intense activity). In some embodiments, the treatment system is configured to be reusable, cleanable, and intuitive for a user to self-apply without medical expertise.

Referring to FIG. 1, the treatment system 10 generally comprises a dressing 100 configured to be attached to a patient at a location surrounding a treatment tissue site, and an air displacement device 200 (e.g., vacuum source, negative pressure pump, etc.) configured to provide a source of negative pressure to a treatment chamber defined between the dressing 100 and the treatment tissue site. Upon operation of the air displacement device 200, the treatment chamber defined between the intact skin of the patient and the dressing 100 functions as a decompression chamber in which the skin and underlying tissue is subject to an outward pulling (e.g. lifting) force (representatively illustrated by the arrows in FIG. 2) as air is evacuated from the treatment chamber. An optional controller coupled to one or both of the dressing 100 and air displacement device 200 may control the application of decompression therapy to the treatment site using the treatment system 10.

As illustrated by the treatment system 10 embodiment of FIG. 1, the dressing 100 and air displacement device 200 are optionally provided as discrete, separate components that are located remotely from one another. In such embodiments, the air displacement device 200 is fluidly and sealingly coupled to the treatment chamber via an external tubing 205. An optional connector port 90 sealingly attached around an opening 111 extending through the dressing 100 may facilitate the fluid connection between the treatment chamber and the air displacement device 200. In other embodiments (such as, e.g., embodiments in which the dressing 100 is configured to be wound around the patient) other connector port structures and/or configurations may be used to sealingly engage and fluidly couple the air displacement device 200 and the dressing 100. In some embodiments, the air displacement device 200 is optionally integrated into a module 300 that is fixedly, or removeably, attached to the dressing 100 to define an integral, self-contained, one-piece treatment system 10.

In addition to the use of the treatment system 10 as a standalone decompression therapy device, in various embodiments the treatment system 10 may be used in conjunction with (and may optionally be integrated into) one or more additional treatment systems. For example, although the treatment system 10 has been described as being used to impart a pulling force onto intact skin surrounding a treatment tissue site, in some embodiments, the treatment system 10 may be used to impart a pulling force onto a wound. The vacuum (pulling force) may be applied continuously or intermittently. In some such embodiments, the treatment system 10 is optionally applied atop (or integrated into) a wound dressing of a negative pressure wound therapy system ("NPWT" system). In yet other embodiments, the treatment system 10 may be used with a variety of other treatment systems, such as, e.g., a heat treatment system, systems configured to treat fractured bones, etc.

Dressing

Figure 3:
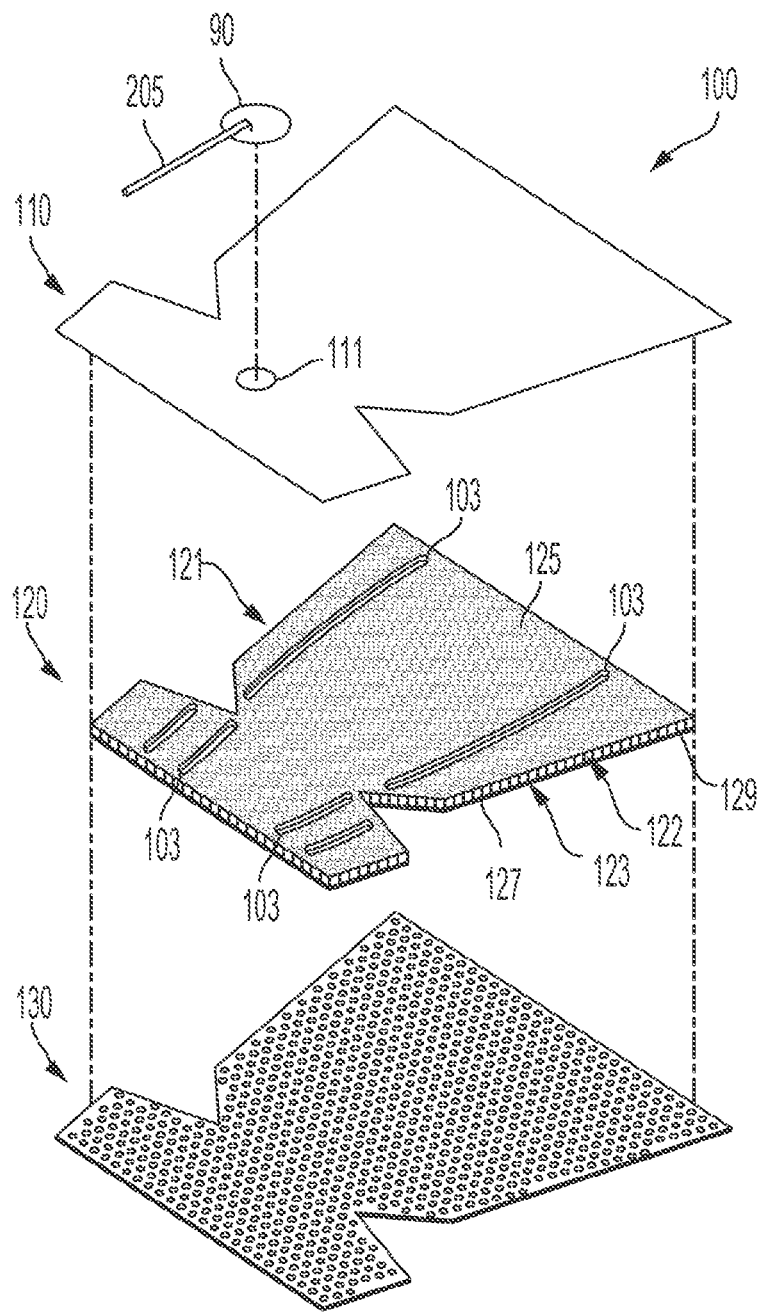
FIG. 3 is an exploded, perspective view of a dressing of a decompression treatment system, according to an illustrative embodiment.

Referring to FIG. 3, the dressing 100 generally includes a flexible occlusive layer 110 and a compressible decompression layer 120 (e.g., manifolding layer, macro-mesh layer, compressible layer, collapsible layer, etc.) comprising a plurality of flow channels extending therethrough. The occlusive layer 110 is configured to be attached to a patient (e.g., using an optional seal member) to define a treatment chamber surrounding the treatment tissue site. Upon attachment of the dressing 100 to a patient, the decompression layer 120 is arranged within the treatment chamber and extends along the treatment tissue site. An optional interface layer 130 extends between the skin of the patient and the decompression layer 120.

Figure 2:
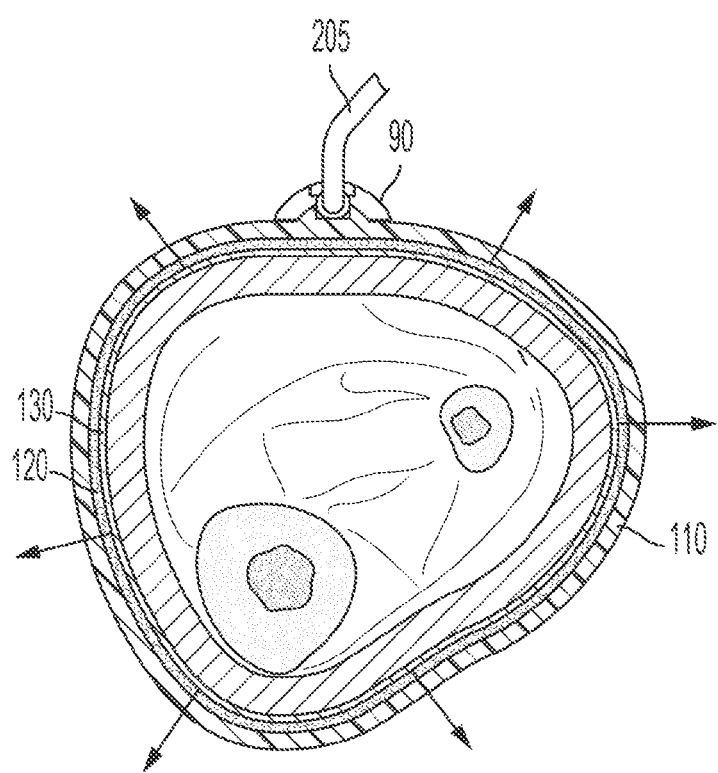
FIG. 2 is a cross-sectional view taken along line 2-2 of FIG. 1.

During operation of the treatment system 10, the evacuation of air from the treatment chamber occurring upon initiation of the air displacement device 200 causes the occlusive layer 110 and decompression layer 120 to be drawn towards the intact skin surrounding the treatment tissue site. Once the vacuum applied by the air displacement device 200 has removed most of the air from the treatment chamber, the continued application of negative pressure to the treatment chamber causes the compressible decompression layer 120 to collapse (e.g., compress) in on itself. This sustained application of negative pressure to the treatment chamber and collapse of the decompression layer 120 causes the intact skin at the treatment tissue site to be pulled outwardly (such as shown by the arrows of FIG. 2), thereby stimulating blood perfusion and lymphatic flow in the subcutaneous portions of the treatment tissue site.

A. Occlusive Layer

The occlusive layer 110 is configured to be sealed to the skin of a patient to envelop (e.g., surround, extend over, cover, etc.) the treatment tissue site. In some embodiments, such as, e.g., where the occlusive layer 110 is defined by a sleeve-like, boot-like, or other annular structure and/or by a sheet-like or tape-like structure configured to be wrapped about an anatomical structure, the occlusive layer 110 extends by approximately 360° (i.e. circumscribes) or more than 360° (i.e. the occlusive layer 110 wraps around upon itself) about a limb, extremity or other anatomical structure of the patient. In other embodiments (such as, e.g., during treatment of a knee, shoulder, elbow, etc.) the occlusive layer 110 is optionally defined by a sheet-like structure that extends less than 360° (e.g., less than 180°) around an anatomical structure of the patient.

Upon operation of the air displacement device 200, the sealed attachment between the occlusive layer 110 and the skin of the patient forms a sealed decompression treatment chamber via which negative pressure is transmitted to the treatment tissue site. An opening 111 is optionally defined through the occlusive layer 110, via which the treatment chamber is fluidly coupled to the air displacement device 200 of the treatment system 10. Alternatively, the treatment chamber is fluidly coupled to the vacuum source via a connector interposed between the skin of the patient and a lower surface of the occlusive layer 110.

The occlusive layer 110 may be formed from a variety of materials that are capable of maintaining a desired vacuum within the treatment chamber during use of the treatment system 10. The occlusive layer 110 is optionally formed from a material having a high Moisture Vapor Transmission Rate (MVTR), to allow moisture (e.g. perspiration) to be evaporated from the treatment tissue site during use of the treatment system 10. The material selected for the occlusive layer 110 is advantageously also sufficiently strong and resilient to allow the occlusive layer 110 to withstand extended periods of use of the treatment system 10. In embodiments in which the occlusive layer 110 is reusable, the material forming the occlusive layer 110 is optionally also sufficiently durable to allow the occlusive layer 110 to be cleaned (e.g. washed) between uses.

As shown in FIG. 3, in some embodiments the occlusive layer 110 is provided as a discrete and separate component of the dressing 100 which is integrated with the other components (e.g., decompression layer 120, interface layer 130, etc.) during attachment of the dressing 100 to the patient. In some such embodiments, the occlusive layer 110 optionally is provided with an adhesive along a lower surface thereof. Such a peel-and-place arrangement (in which the occlusive layer 110 is integrated with a seal member) allows the dressing 100 to be quickly wrapped around (or otherwise attached to) an anatomical structure of a patient (e.g., a foot, leg, arm, etc.), enabling a quick attachment of the dressing 100 to a patient. In various embodiments, the occlusive layer 110 is alternatively removably, or fixedly, integrated with the decompression layer 120. The adhesive may be pattern coated in discrete islands of any shape to further improve MVTR but at the periphery or border the adhesive preferably is continuous to form a good seal.

Non-limiting examples of materials that may be used for the occlusive layer 110 include: polyurethane film (e.g., ESTANE 5714F), other polymer films such as, but not limited to poly alkoxyalkyl acrylates and methacrylates (e.g., such as those described in Great Britain Patent Application No. 1280631A filed Nov. 22, 2002, the entire disclosure of which is incorporated by reference herein), plasticized PVC, silicones, block copolymer elastomers (e.g., block copolymer elastomers available under the trade designation KRATON), polyolefins (including metallocene polyolefins), polyamides (e.g., polyester block amides available under the trade designation PEBAX), elastomeric polyesters (including elastomeric Polyesters available under the trade designation HYTREL), etc. Thermoset elastomers may also be suitable, such as ethylene propylene diene monomers (EPDM), butyl rubbers, nitrile rubbers, natural rubbers, neoprenes, etc., laminated fabrics (e.g., polyurethane laminated fabric, expanded polytetrafluoroethylene laminated fabric, etc.), polymer-coated fabrics, fabrics made from various synthetic fibers, etc. Fabrics may be knitted, woven, or nonwoven. Nonwovens include spunbonds, hydroentangled, spunlaced, blow microfiber as well as laminates thereof.

B. Decompression Layer

The decompression layer 120 (e.g., manifolding layer, macro-mesh layer, compressible layer, collapsible layer, etc.) is configured to impart a pulling, or lifting, force onto the skin at the treatment tissue site. The decompression layer 120 is formed from a material including (or defining) a plurality of flow channels (e.g. pathways 103, passageways, pores, etc.) therethrough. The flow channels of the decompression layer 120 allow for a sustained transmission (e.g., manifolding) of negative pressure to the treatment tissue site during operation of the treatment system 10. Some or all of the flow channels are optionally interconnected to improve the distribution of fluids (e.g. air) provided to or removed from the treatment tissue site. The decompression layer 120 is formed from a compressible material having a stiffness sufficient to provide airflow through the flow channels at negative pressures up to at least approximately 150 mmHg.

Referring to FIG. 2, as air is evacuated from the treatment chamber during operation of the treatment system 10, the greater stiffness of the skin/muscle/bone underlying the treatment tissue site relative to the stiffness of the dressing 100 causes the occlusive layer 110 to be drawn against an outwardly-facing surface 125 (e.g. an upper surface, an outer surface, a surface facing away from the tissue site, etc.) of the decompression layer 120, and also causes a tissue-facing surface 127 (e.g. a lower surface, an inner surface, etc.) of the decompression layer 120 to be drawn towards and against (directly, or indirectly via an optional interface layer 130) the skin at the treatment tissue site. Once air has substantially been evacuated from the treatment chamber, the continued application of a vacuum to the treatment chamber results in the collapse of the compressible decompression layer 120.

Figure 4A:
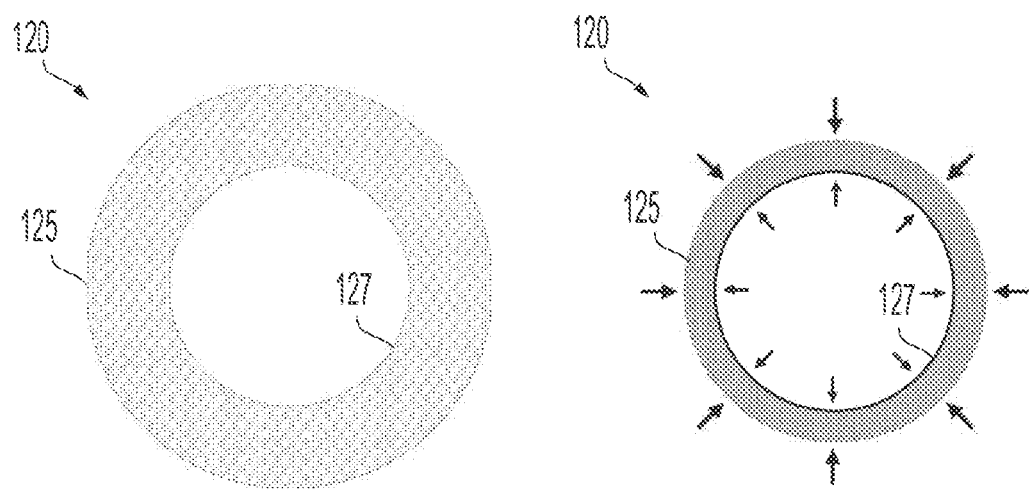
FIG. 4A is a schematic representation of the collapse of a decompression layer of a dressing of a decompression treatment system, according to an illustrative embodiment.

The direction (i.e. outward/inwards; upwards/downwards; away from/towards the tissue site; in a radial direction; in a vertical direction; etc.) in which the decompression layer 120 collapses (e.g., compresses) varies depending on the construction of the decompression layer 120. The collapse of a decompression layer 120 comprising a single layer, and formed from a material having a uniform density, in response to a vacuum is representatively illustrated in FIG. 4A. As shown by the arrows of FIG. 4A, such a decompression layer 120 having a center of stiffness that is located closer to the tissue-facing surface 127 than the outwardly-facing surface 125 of the decompression layer 120 will compress such that the outwardly-facing surface 125 of the decompression layer 120 is drawn towards the tissue-facing surface 127 of the decompression layer 120.

Figure 4B:
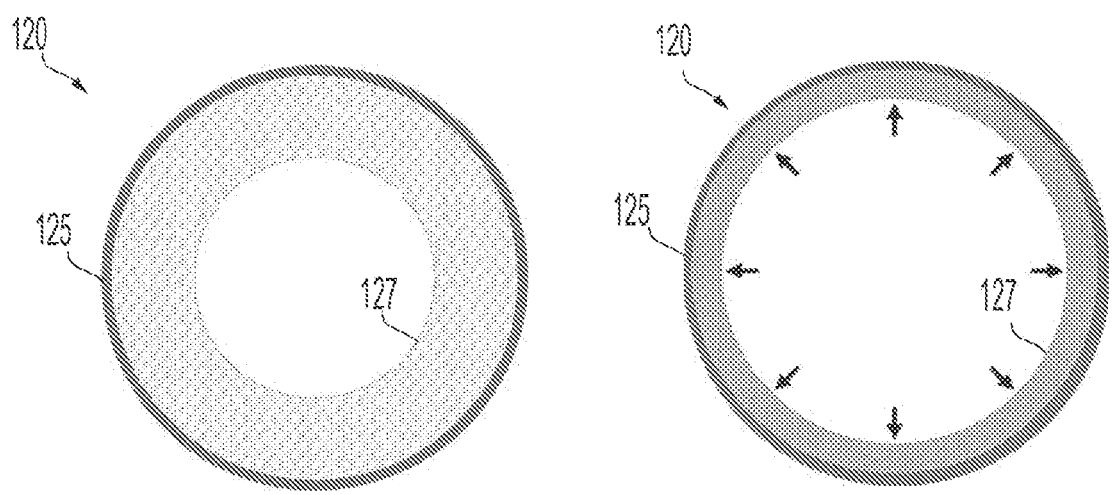
FIG. 4B is a schematic representation of the collapse of a decompression layer of a dressing of a decompression treatment system, according to an illustrative embodiment.

The collapse of a decompression layer 120 comprising an outer portion (i.e. a portion of the decompression layer 120 adjacent the outwardly-facing surface 125 that faces away from the tissue site) formed from a stiff material and an inner portion (i.e. a portion of the decompression layer 120 adjacent the tissue-facing surface 127) formed from a softer material in response to a vacuum is representatively illustrated in FIG. 4B. In contrast to the representative decompression layer 120 illustrated in FIG. 4A, a decompression layer 120 such as illustrated in FIG. 4B, which is defined by a center of stiffness that is located closer to the outwardly-facing surface 125 than the tissue-facing surface 127 of the decompression layer 120, will experience a parallel plate effect upon being subject to a vacuum during use of the treatment system 10. As illustrated by the arrows of FIG. 4B, this sandwiched arrangement of a softer, inner-half portion of the decompression layer 120 between two stiffer structures (i.e., the skin/muscle/bone underlying the treatment tissue site and a relatively harder, outer-half portion of the decompression layer 120) results in the tissue-facing surface 127 of the decompression layer 120 being drawn towards the outwardly-facing surface 125 of the decompression layer 120 as the decompression layer 120 collapses. The pulling force imparted onto the skin at the treatment tissue site as a result of such an outwardly directed collapse of the decompression layer 120 is effective for enhancing lymphatic flow and blood perfusion at the treatment tissue site.

Given the impact of the parallel plate effect on lymphatic flow and blood perfusion at a tissue site, the decompression layer 120 is advantageously constructed such that the center of stiffness of the decompression layer 120 is located closer to the outwardly-facing surface 125 than the tissue-facing surface 127 of the decompression layer 120). The decompression layer 120 is also advantageously constructed from a material that is sufficiently flexible to allow the decompression layer 120 to be secured to a patient and to allow for a range of motion of the body part to which the dressing 100 is attached during use of the treatment system 10.

The decompression layer 120 is advantageously also formed having sufficient structural integrity and resilience to withstand repeated applications of negative pressure thereto over the course of operation of the treatment system 10 (e.g., for periods of up to, or greater than, one week). To facilitate the reuse of the treatment system 10 with the same, or other, patients, the decompression layer 120 is additionally optionally constructed having a durability that allows the decompression layer 120 to be washed in-between uses.

Figure 5:
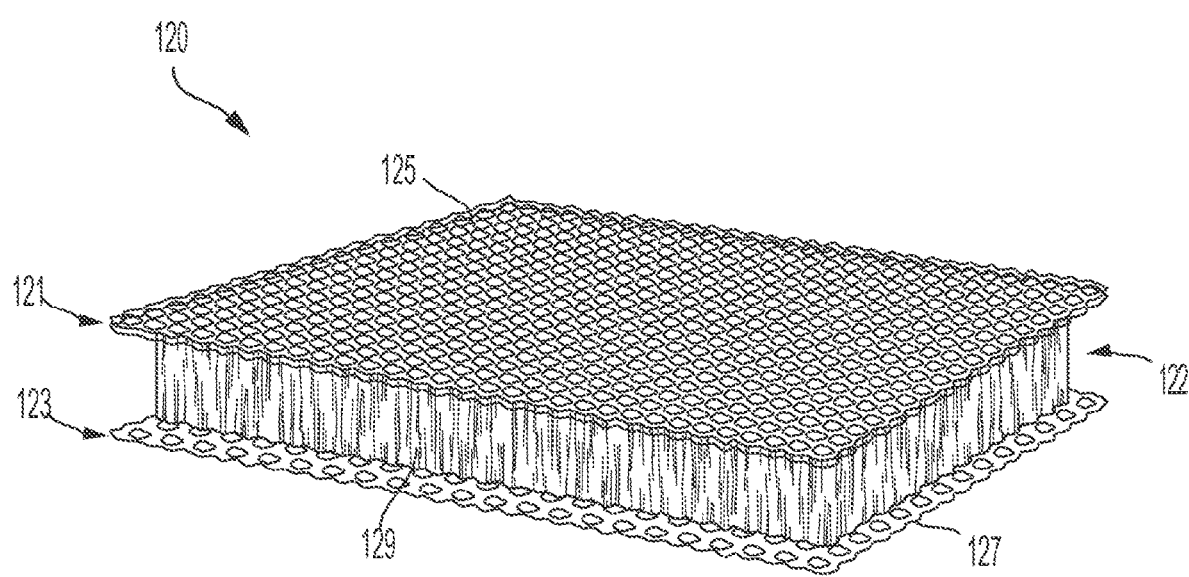
FIG. 5 is a perspective view of a material forming the decompression layer of a dressing of a decompression treatment system, according to an illustrative embodiment.

Referring to FIG. 5, a flexible, resilient and durable decompression layer 120 construction configured to impart an increased pulling force on skin at a tissue treatment site is shown according to an exemplary embodiment. In the decompression layer 120 embodiment of FIG. 5, the decompression layer 120 is defined by a macro-mesh material comprising a lower layer 123, an upper layer 121, and an intermediate layer 122. Upon integration of the decompression layer 120 into the tissue treatment system 10, a lower surface of the lower layer 123 defines the tissue-facing surface 127 (e.g., a lower surface, an inner surface, a radially inwardly extending surface, etc.) of the decompression layer 120, and an upper surface of the upper layer 121 defines the outwardly-facing surface 125 (e.g. an upper surface, an outer surface, a radially outwardly extending surface, etc.) of the decompression layer 120. The upper layer 121 and lower layer 123 are vertically offset from one another, as well as interconnected to one another, via the intermediate layer 122 (e.g., a connector layer).

The upper layer 121 and lower layer 123 defining the macro-mesh material forming the decompression layer 120 may be defined by a variety of different materials. To provide the decompression layer 120 with a desired degree of resilience and durability, one or both of the upper layer 121 and the lower layer 123 are formed from a textile material. The textile may be defined by a variety of different woven or non-woven patterns, weights, densities, fibers, stiffnesses, etc., depending on the desired properties of the decompression layer 120. According to various embodiments, one or both of the upper layer 121 and the lower layer 123 are formed from a polymer such as a polyester or nylon material (e.g., a polymer or nylon mesh).

To provide the decompression layer 120 with the desired offset center of stiffness (i.e., a center of stiffness that is located closer to the outwardly-facing surface 125 of the decompression layer 120), the upper layer 121 is formed from a different material, has a different construction, or otherwise varies from the lower layer 123. For example, the upper layer 121 is formed from a material having a greater stiffness than the material used for the lower layer 123. The materials selected for the upper layer 121 and/or lower layer 123 may optionally include a coating (e.g., an antimicrobial coating, a hydrophobic coating, etc.), to provide the decompression layer 120 with additional desired features.

The intermediate layer 122 may be formed from a variety of different materials. As shown in FIG. 5, according to various embodiments, the intermediate layer 122 is formed of a plurality of durable, resilient, and flexible (e.g., collapsible, deflectable, bendable, compressible, etc.) filament fibers 129 that allow the decompression layer 120 to collapse (e.g., compress, or otherwise cause a distance between the upper layer 121 and lower layer 123 to be reduced) one or more times during use of the treatment system 10. The filament fibers 129 forming the intermediate layer 122 may be defined by a variety of yarn types (e.g. monofilament, multifilament, spun, etc.), diameters, lengths, materials, weights, denier, densities, stiffness, etc. The selection and arrangement of filament fibers 129 may be varied based on the desired characteristics of the manifold layer. For example, the length and density of the filament fibers 129 forming the intermediate layer 122 may be varied based on a desired stiffness of the decompression layer 120.

The effects of varying various properties of the dual-layered decompression layer 120 arrangement of FIG. 5 on the degree of pulling force imparted onto the skin during operation of the treatment system 10 are described with reference to FIGS. 6A-6F and FIG. 7. Non-limiting properties of the decompression layer 120 embodiments illustrated in FIGS. 6A-6E are provided in the table of FIG. 7.

In general, a decompression layer 120 comprising a macro-mesh configuration such as, e.g., representatively illustrated by the embodiment of FIG. 5, is defined by a greater stiffness than a decompression layer 120 formed of single layer, uniformly dense, reticulated foam material. Accordingly, as illustrated by the table of FIG. 7—even if the dual-layered decompression layer 120 is defined by a center of stiffness located at (or substantially at) a center of the decompression layer 120 (such as, e.g., illustrated by the embodiments of FIGS. 6A and 6B)—the structure of the dual-layer decompression layer 120 provides enhanced blood perfusion and lymphatic flow at a treatment tissue site as compared to a decompression layer formed of a single layer, uniformly dense, reticulated foam material.

Figure 6A:
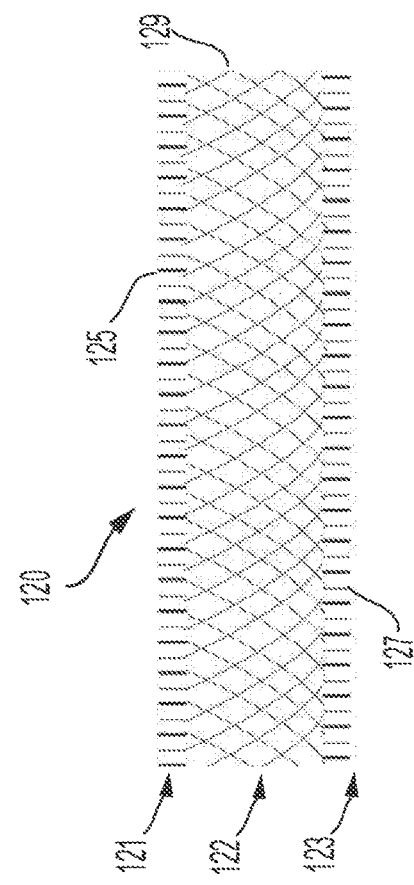
FIGS. 6A-6F are cross-sectional view of decompression layers, according to illustrative embodiments.

For example, as shown in the table of FIG. 7, in one embodiment, a decompression layer 120 embodiment such as shown in FIG. 6A which comprises a macro-mesh (3-dimensional knit) configuration having a high-density and/or high-stiffness (e.g., formed of a polyester material having a denier of approximately 3.4) upper layer 121 and lower layer 123, may increase the degree of perfusion and flow at the treatment tissue site by approximately 10.5% as compared to a decompression layer formed of a single layer, uniformly dense, reticulated foam material. As also shown in the table of FIG. 7, in one embodiment, a decompression layer 120 embodiment such as shown in FIG. 6B which comprises a macro-mesh configuration having a low-density and/or low-stiffness (e.g., formed of a polyester material having a denier of approximately 1.5) upper layer 121 and lower layer 123, may increase the degree of perfusion and flow at the treatment tissue site by approximately 7.7% as compared to a decompression layer formed of a single layer, uniformly dense, reticulated foam material.

Figure 6B:
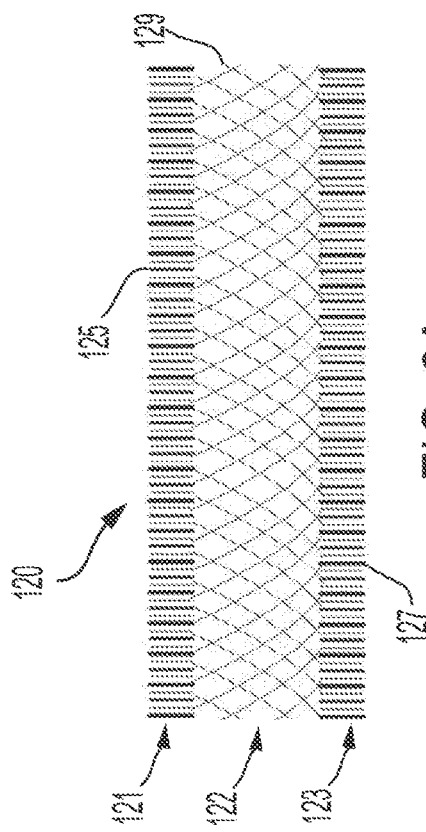

As illustrated by a comparison of the performance of the decompression layer 120 examples of FIGS. 6A and 6B as summarized in the table of FIG. 7, increasing the density (and stiffness) of the material used to form the substantially similar upper layer 121 and lower layer 123 of a decompression layer 120 such as e.g., illustrated by the embodiment of FIG. 6A will provide an increased pulling force as compared to a dual-layer decompression layer 120 embodiment having an upper layer 121 and lower layer 123 each formed from a lower density (and lower stiffness) material (such as, e.g., representatively illustrated by the embodiment of FIG. 6B).

Figure 6C:
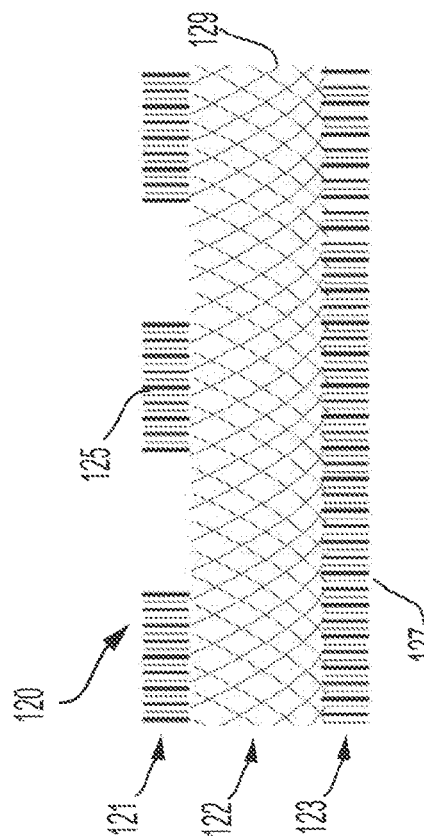

As illustrated by the table of FIG. 7, a dual-layer decompression layer 120 arrangement, such as representatively shown in FIG. 6C comprising an upper layer 121 formed from a higher density (and higher stiffness) material and a lower layer 123 formed from a lower density (and lower stiffness) material—which accordingly is defined by a center of stiffness located closer to the outwardly-facing surface 125 of the decompression layer 120—will impart an increased pulling force on the treatment tissue site as compared to a decompression layer 120 formed having both an upper layer 121 and a lower layer 123 formed from materials having the same density (and same stiffness), such as, e.g., the decompression layer embodiments of FIGS. 6A and 6B. For example, as compared to the 10.5% improvement over foam of the decompression layer 120 embodiment of FIG. 6A (which is formed from high density/stiffness upper layer 121 and lower layer 123) and the 7.7% improvement over foam of the decompression layer 120 embodiment of FIG. 6B (which is formed from low density/stiffness upper layer 121 and lower layer 123), a decompression layer embodiment having a high density and/or high stiffness upper layer 121 and a low density and/or low stiffness lower layer 123 (such as, e.g., the embodiment of FIG. 6C) exhibits an improvement of 24.6% in perfusion and flow as compared to a decompression layer formed of a single layer, uniformly dense, reticulated foam material.

Figure 6D:
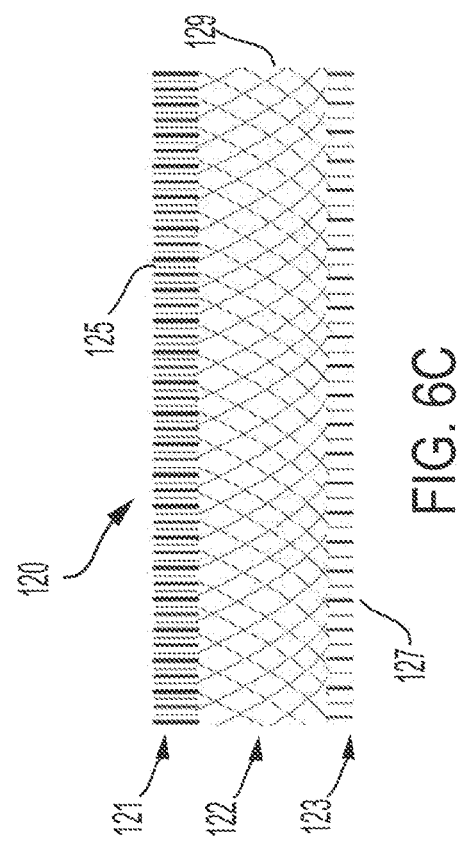

As illustrated by FIG. 7, the decompression layer 120 embodiment of FIG. 6D is formed from a high density (and high stiffness) material, and the lower layer 123 of the decompression layer 120 is also formed from a low density (and lower stiffness) material, similar to the materials used for the lower layer 123 and upper layer 121 of the decompression layer 120 embodiment of FIG. 6C. However, whereas the decompression layer 120 embodiment of FIG. 6C comprises a continuously extending upper layer 121, the upper layer 121 of the decompression layer 120 embodiment of FIG. 6D is instead defined by strips of the high density (and high stiffness) material that are separated from one another by portions of the intermediate layer 122 along which no upper layer 121 extends.

As a result of the interrupted upper layer 121 configuration of the decompression layer 120 embodiment of FIG. 6D, the center of stiffness of the decompression layer 120 of FIG. 6D is located closer to the tissue-facing surface 127 than to the outwardly-facing surface 125 of the decompression layer 120. As shown in FIG. 7, the effect of the center of stiffness of the decompression layer 120 of FIG. 6D being located closer to the tissue-facing surface 127 of the decompression layer 120 is that the decompression layer 120 embodiment of FIG. 6D imparts even less of a pulling force onto skin at the treatment tissue site than a uniformly dense, single layer reticulated foam-based decompression layer. Accordingly, as shown by the table of FIG. 7, a decompression layer arrangement such as that of FIG. 6D may result in a decrease in perfusion and flow at the treatment tissue site of 16.1% as compared to a decompression layer formed of a single layer, uniformly dense, reticulated foam material.

The degree of pulling force imparted onto the skin by the decompression layer 120 may be further augmented by constructing the decompression layer 120 to maximize the distance of the center of stiffness from the tissue-facing surface 127 of the decompression layer 120. As described with reference to FIG. 6C, one such option for maximizing this distance is to increase the stiffness of the upper layer 121 of the decompression layer 120 relative to the stiffness of the lower layer 123 of the decompression layer 120. As shown in FIG. 7, and illustrated by the embodiments of FIGS. 6E and 6F, an additional option for increasing the pulling force imparted onto skin during use of the treatment system 10 is to increase a thickness (i.e., distance between the outwardly-facing surface 125 and the tissue-facing surface 127) of the decompression layer 120.

Figure 6E:
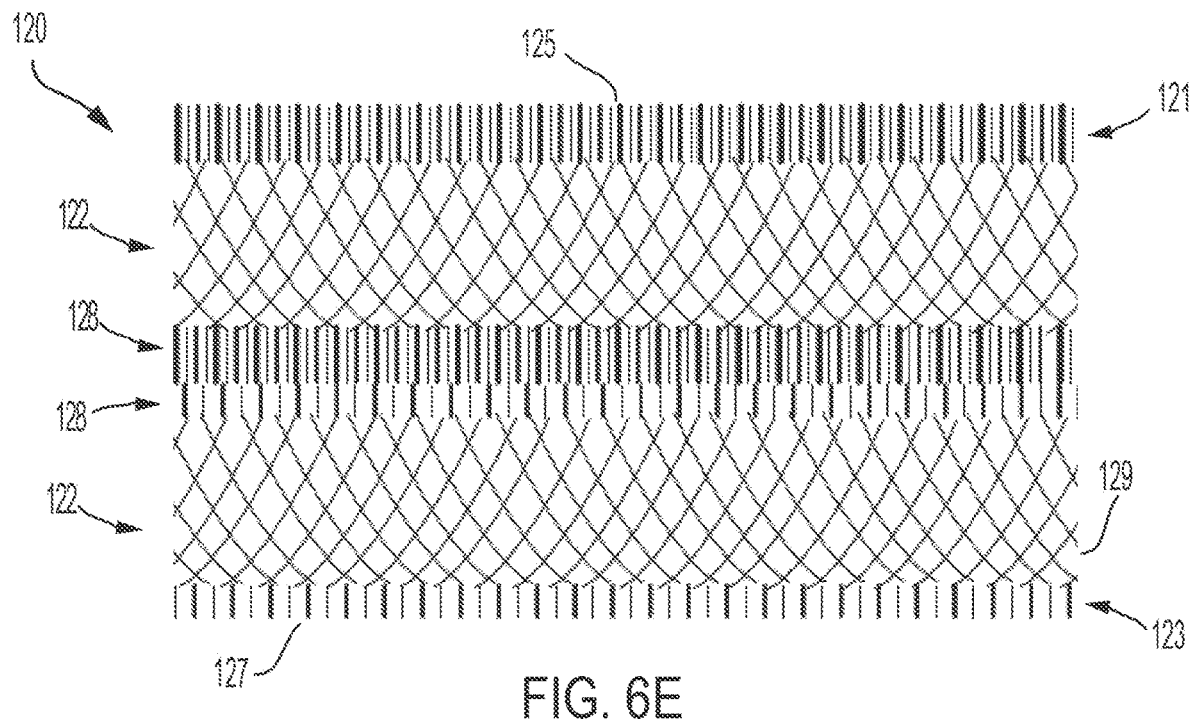
Figure 6F:
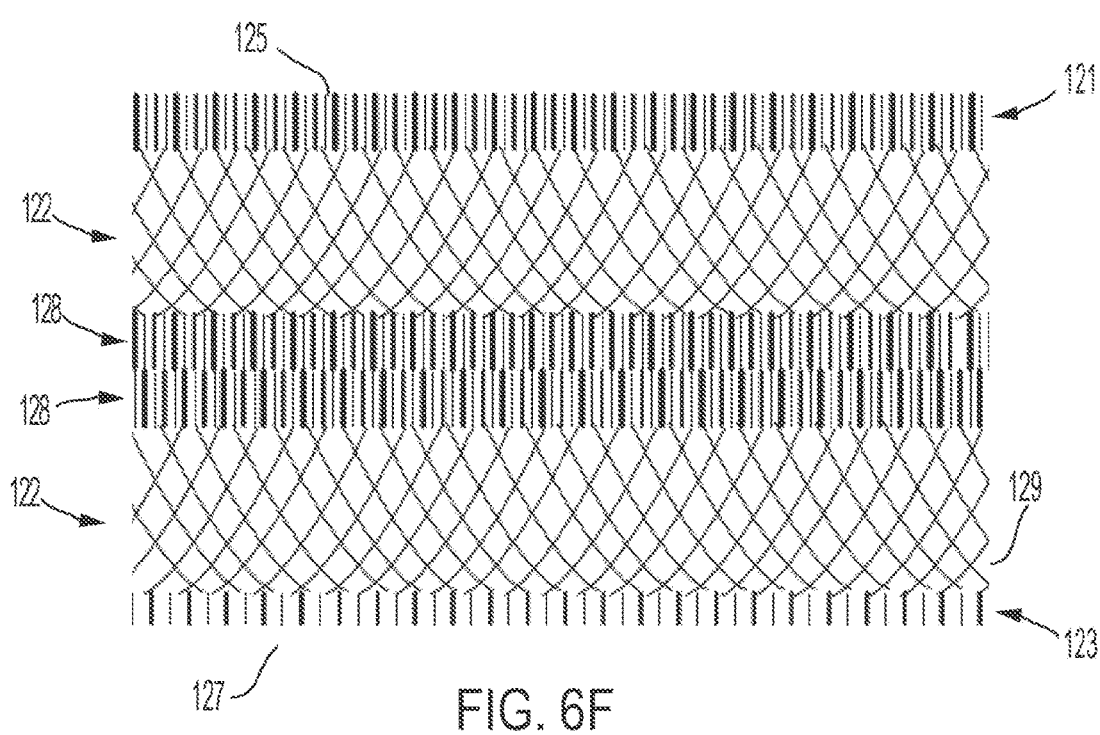

As representatively illustrated by the embodiments of FIGS. 6E and 6F, an increased thickness of the decompression layer 120 may be accomplished by incorporating one or more additional textile layers 128 (similar to the upper layer 121 or the lower layer 123) into the decompression layer 120 structure. As shown in FIGS. 6E and 6F, these additional one or more layers 128 may be integrated into the decompression layer 120 structure via one or more additional intermediate layers 122. To maximize the pulling force imparted by the decompression layer 120 onto the skin, the additional textile layer 128 are advantageously integrated into the decompression layer 120 in a manner that maintains the center of stiffness of the decompression layer 120 closer to the outwardly-facing surface 125. For example, as illustrated by the embodiment of FIG. 6E, the decompression layer 120 may comprise the decompression layer 120 of FIG. 6A bonded, or otherwise attached) along the outwardly-facing surface 125 of the decompression layer 120 of FIG. 6B. As shown in Table 7, such a multilayer decompression layer 120 configuration as illustrated by the embodiment of FIG. 6E may provide an increase in perfusion and flow at a treatment tissue site of 51.2% as compared to a decompression layer formed of a single layer, uniformly dense, reticulated foam material.

C. Interface Layer

An optional interface layer 130 (i.e. skin contact layer) is disposed adjacent the skin of the patient upon the attachment of the dressing 100 to the patient. The interface layer 130 may be incorporated into the dressing 100 for a variety of reasons, and may be defined by a variety of different features. For example, the interface layer 130 may be configured to: decrease discomfort and irritation during use of the treatment system 10; provide cooling; wick liquid away from the skin; function as an antimicrobial barrier; create friction between the decompression layer 120 and the skin to enhance the lifting force imparted onto the skin by the decompression layer 120, etc.

The materials forming the interface layer 130 may be selected based on the desired features of the interface layer 130. In general, the optional interface layer 130 is constructed from a light-weight, thin material that does not impede flow between the skin and the decompression layer 120, and which does not irritate the skin. In some embodiments, the interface layer 130 may comprise a textile, or other porous material, such as, e.g., a non-woven, breathable fabric. As shown in FIG. 3, in other embodiments, the interface layer 130 may be formed from an occlusive material including a plurality of perforation or holes formed therethrough. The interface layer 130 is optionally also formed having a durability and resilience sufficient to allow for reuse of the interface layer 130.

The interface layer 130 may be integrated into the dressing 100 according to a variety of arrangements. In some embodiments the interface layer 130 is provided entirely separate and detached from the decompression layer 120. In some such embodiments, the interface layer 130 may be provided as a sock or sleeve that is slid onto and around a treatment tissue site (e.g., a leg or arm of the patient). Once positioned in the desired location, the decompression layer 120 and occlusive layer 110 components of the dressing 100 are attached to the patient. Such a decoupled arrangement may advantageously allow a user to verify that the interface layer 130 lies taut and smoothly along the skin prior to attaching the remaining components of the dressing 100, thus minimizing the risk of pinching resulting from wrinkling along the interface layer 130 during use of the treatment system 10.

Figure 8A:
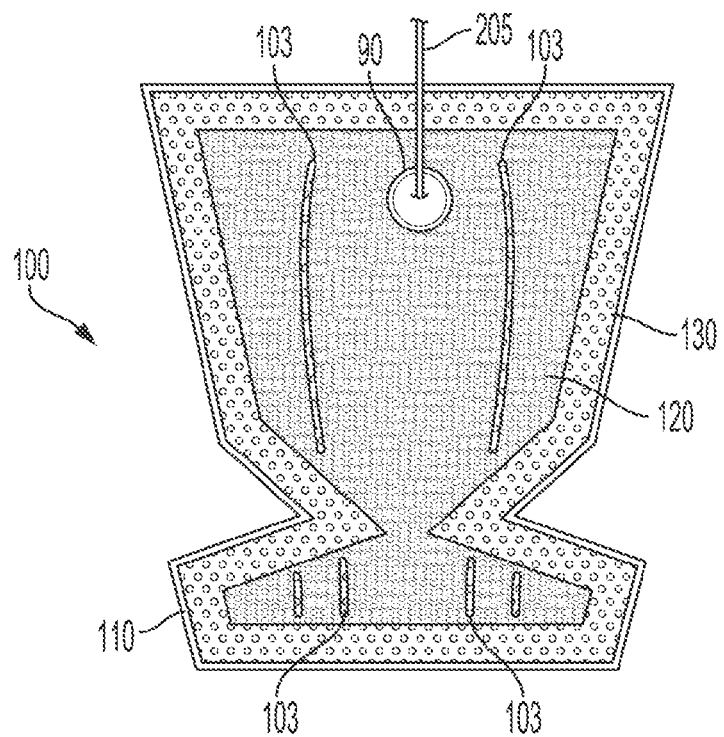
FIG. 8A is a perspective view of a dressing of a decompression treatment system, according to an illustrative embodiment.
Figure 8B:
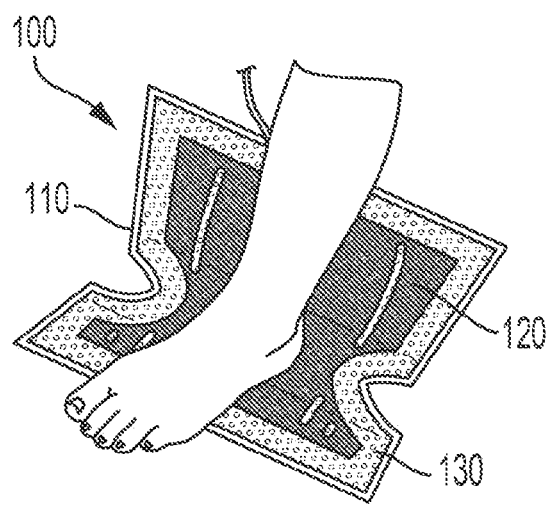
FIG. 8B is a perspective view of the dressing of FIG. 8A being attached to a patient, according to an illustrative embodiment.

Alternatively, the interface layer 130 is partially, or entirely, attached along the tissue-facing surface 127 of the decompression layer 120, such as, e.g., illustrated by the embodiment of FIG. 8A. In some embodiments, the interface layer 130 is removeably attached to the decompression layer 120, allowing the interface layer 130 to be detached as desired (e.g., to wash the interface layer 130 prior to reuse of the treatment system 10). In other embodiments, the interface layer 130 is instead be fixedly secured to the entirety of, or a portion of (e.g., the peripheral edges of) a lower surface of the decompression layer 120 (e.g., by heat bonding, via adhesive, via ultrasonic welding, etc.). Such a fixed attachment of the interface layer 130 and the decompression layer 120 may advantageously minimize the presence of loose spots between the interface layer 130 and decompression layer 120, which may reduce the occurrence of ridges and bubbling, and thereby minimize the risk of pinching during operation of the treatment system 10.

D. Seal Member

A seal member of the dressing 100 is used to provide a sealing (e.g., fluid-tight) attachment between the occlusive layer 110 and an underlying surface (e.g., skin, a section of the occlusive layer 110 that has been wrapped around the patient, an optional interface layer 130, etc.) that enables a vacuum to be created and maintained within the treatment chamber surrounding the tissue treatment site. Advantageously, the seal member is structured to be sufficiently robust to continuously, or intermittently, maintain a desired negative pressure within the treatment chamber over the duration of use of the treatment system 10. In some embodiments, the seal member is self-adhering and able to provide a fluid-tight attachment to a variety of different surfaces, including, e.g., skin, the optionally included interface layer 130, the decompression layer 120, the occlusive layer 110, etc. In embodiments in which the seal member is reusable, the seal member may be sterilizeable. Alternatively, the seal member may be replaceable (e.g., removable), such that a new seal member may be used with each subsequent use of the treatment system 10.

The seal member may be defined by a variety of, and combination of, various sealing structures. The seal member may optionally comprise a discrete component(s) provided separately from the other components of the dressing 100. For example, the seal member may comprise a tape-like or film-like structure (e.g., thermoplastic elastomer gel strips, silicone/acrylic trilaminate film, etc.) that is applied along the entirety of, or along the outer periphery of, the upper layer of the occlusive layer 110 to secure the dressing 100 to the patient. In other embodiments, the seal member alternatively, or additionally, includes one or more sealing cuffs 1200, 1202 (see, e.g., FIG. 1). In other embodiments, the seal member includes an adhesive (e.g., an acrylic or silicone adhesive) that is provided along (e.g., integrated with) or disposed on an entirety or periphery of a lower surface of the occlusive layer 110.

In various embodiments, the sealing attachment provided by the seal member may be reinforced and/or concealed by a hook-and-pile fastener, cohesive bandage, cast protector, or other structure that is positioned atop the dressing 100 following the attachment of the dressing 100 to a patient.

Dressing Configurations

The size, shape and configuration of the dressing 100 may vary depending on a variety of factors, including, e.g., the treatment tissue site being treated, the patient being treated, the duration of the treatment being provided, etc. Additional features of the dressing 100 that may be varied depending on the desired use of the treatment system 10 include, e.g., the degree of tailoring of the dressing 100 to a particular treatment site, the extent to which the dressing 100 is attached to a patient, the incorporation of features facilitating the attachment of the dressing 100 to a patient, the degree of integration of the components of the dressing 100, etc.

Figure 8C:
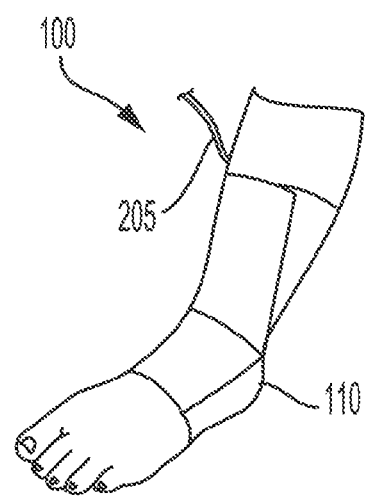
FIG. 8C is a perspective view of the dressing of FIG. 8A attached to a patient, according to an illustrative embodiment.

As illustrated in FIG. 3 and FIGS. 8A-8C, in some embodiments, a sheet-like dressing 100 may be wrapped around a tissue site to substantially (e.g. entirely) circumscribe a portion of the patient (e.g. a calf, a wrist, an ankle, etc.). For example, the sheet-like dressing 100 may be configured to be wrapped around a limb or extremity of a patient by approximately 360° or more. For example, the sheet-like dressing 100 can be formed to be under and behind the patient's foot and ankle and then wrapped forward to enclose the ankle. A first portion of the sheet-like dressing 100 (e.g., extending around the medial side of the ankle) can overlap a second portion of the sheet-like dressing 100 (e.g., extending around the lateral side of the ankle) as shown in FIG. 8C. An adhesive border or separate sealing strip may be provided to allow the dressing 100 to be sealed to itself to form a closed annular structure around the ankle or other tissue site. Advantageously, the dressing 100 as configured in FIGS. 8A-C can applied to the ankle with minimal disruption to the tissue site, for example without needing to pull, slide, squeeze, etc. the tissue site through a sleeve or other annular structure. In some embodiments the sheet-like dressing 100 is optionally shaped and sized for application to a particular treatment site (e.g., particularly for ankles, particularly for wrists, particularly for knees, particularly for shoulders, etc.) and may be provided in different sizes for patients of different sizes.

In other embodiments, the dressing 100 may be provided as a flexible tape that can be wound around a treatment tissue site, or which may be attached as one or more strips atop a treatment tissue site. Such a tape-like dressing 100 arrangement may provide a user with the ability to customize the attachment of the treatment system 10 to a variety of different treatment sites and to a variety of different patients. In some embodiments, an adhesive is optionally provided along an outer periphery of the tape-like structure to facilitate the attachment of the dressing 100 to the patient. In such embodiments, the application of the tape-like structure such that adjacent segments of the tape (e.g. adjacent winding or adjacent strips) overlap may allow the dressing 100 to be attached to a patient without requiring any additional sealing of the dressing 100 to the patient. Alternatively, an additional sealing layer (such as, e.g., the occlusive layer 110) may be attached to a patient to surround the tape-like dressing 100 that has been applied to the patient.

In yet other embodiments, the dressing 100 defines a closed annular structure configured to extend circumferentially about an entirety of a limb or other extremity by at least 360°. For example, an annular dressing can be defined by a sleeve-like structure having a generally tubular shape that extends between a first open end and a second open end. In some embodiments the sleeve-like annular dressing extends between a first open end and a second open end, and is shaped, sized and contoured for attachment around a specific extremity of a patient.

Heat Moldable Splint for Use with a Negative Pressure Therapy System

As discussed above, negative pressure therapy may be advantageous for swelling reduction and improved healing of sprained, broken, or otherwise-injured joints. In some cases, it may also be clinically-desirable to immobilize an injured joint to facilitate healing and reduce a risk of aggravating the injury. One aspect of this disclosure is a determination that a treatment system or kit which integrates both joint immobilization and negative pressure therapy features would be advantageous for treating joint injuries. FIGS. 9-23 relate generally to using a heat-moldable splint, for example comprising an extruded polymer web or netting, with a negative pressure therapy dressing to provide both joint immobilization and negative pressure therapy.

Figure 21:
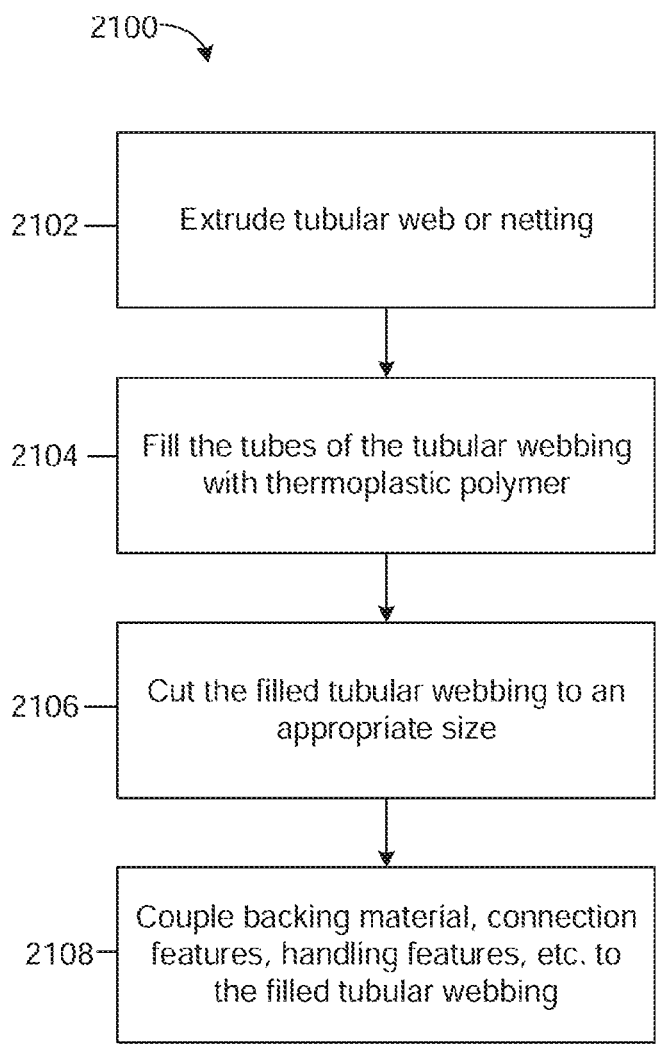
FIG. 21 is flowchart of a process for manufacturing a heat-moldable splint, according to an exemplary embodiment.
Figure 22:
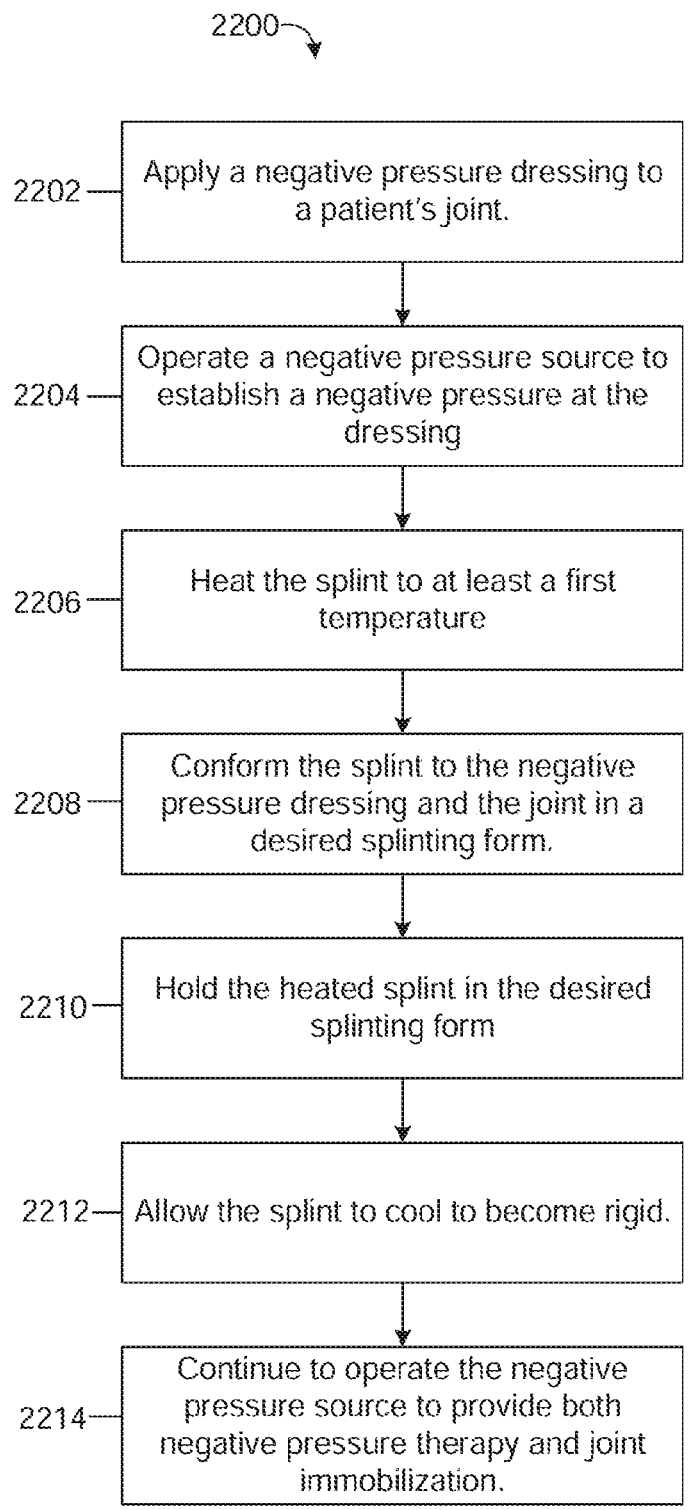
FIG. 22 is a flowchart of a process for applying a negative pressure dressing and heat-moldable splint, according to an exemplary embodiment.
Figure 23:
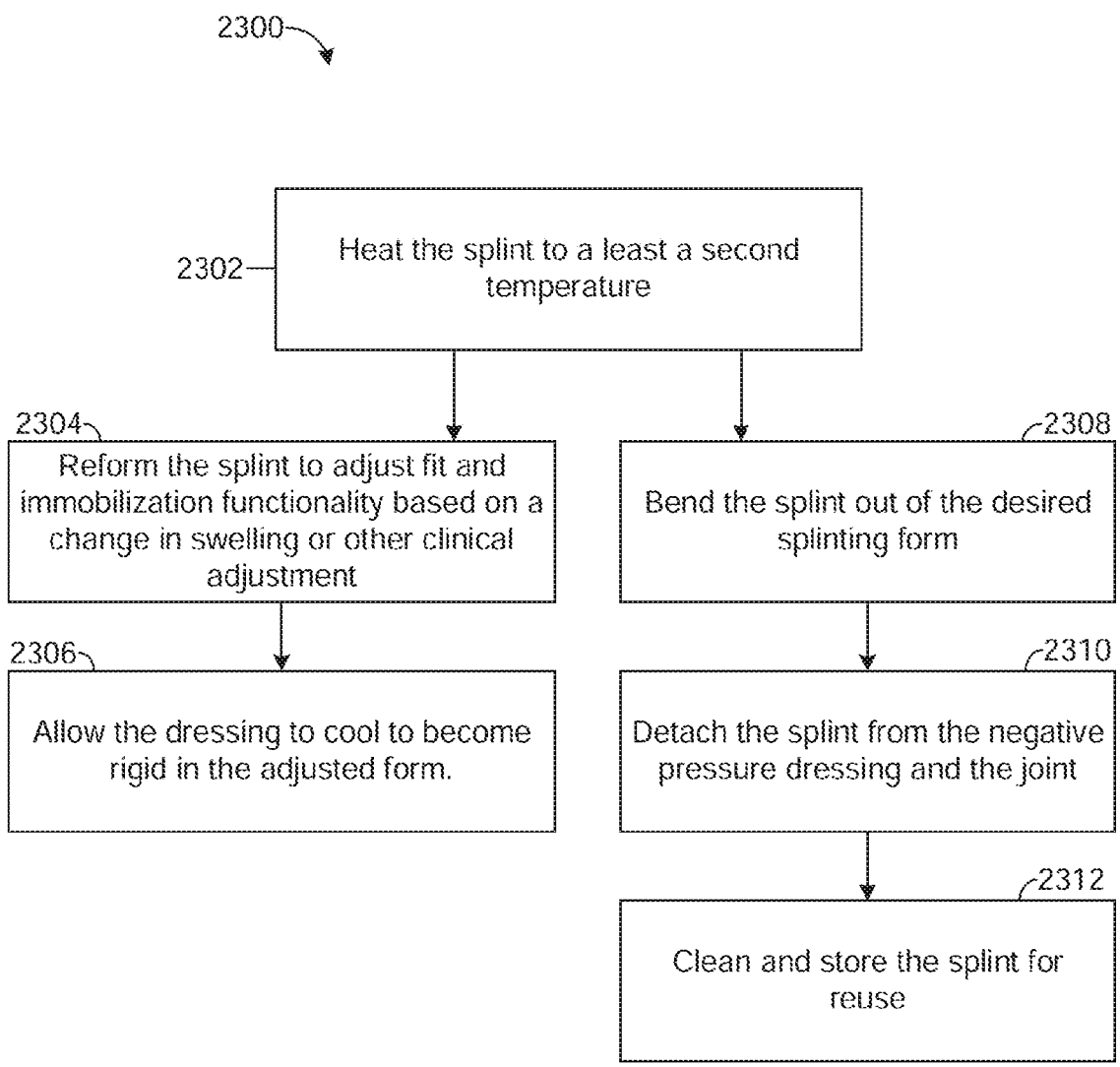
FIG. 23 is a flowchart of a process for adjusting or removing the heat-moldable splint from a joint and/or from the negative pressure dressing, according to an exemplary embodiment.

Referring generally to FIGS. 9-23, various features relating to a treatment system including a heat-moldable splint and a negative pressure therapy system are shown. In particular, FIGS. 9-14 show various applications of a negative pressure dressing and a heat-moldable splint to an injured joint, FIG. 15 shows a treatment kit including a heat-moldable splint and negative pressure therapy components, FIGS. 16-20 show various embodiments of extruded polymeric articles (webs, nettings, tubing assemblies) that can be used in a heat-moldable splint for use with a negative pressure therapy component, FIG. 21 shows a process for manufacturing a heat-moldable splint, and FIGS. 22-23 shows processes for providing treatment using a negative pressure and immobilization treatment system, according to various exemplary embodiments. These drawings and various advantages thereof are described in detail below.

A. Heat-Moldable Splint Applications

Referring now to FIGS. 9-14, perspective view of various applications of the negative pressure therapy dressing 100 and a heat-moldable splint 900 to an ankle of a patient are shown, according to exemplary embodiments. In the examples shown, the dressing 100 is configured as described above, for example with reference to FIGS. 8A-C. In other embodiments, various other embodiments of a negative pressure therapy dressing can be used. In yet other embodiments, the heat-moldable splint can be applied with a non-NPT dressing or without a dressing over the joint. Furthermore, in the example shown, the dressing 100 is applied to substantially cover the ankle region of the patient, i.e., from the forefoot or midfoot of the patient through a mid- or high-calf of the patient. In other embodiments, the present disclosure can be adapted for use in applying negative pressure and immobilization therapy to other joints or body parts (e.g., knees, ankles, wrists, elbows, shoulders, ribs, fingers, hands, toes, feet, limbs, necks). FIGS. 9-14 show the heat-moldable splint applied in various desired splinting configurations (applications, forms, approach etc.).

As described in detail below, the splint 900 is configured to moldable (pliable, conformable, flexible, etc.) in a first temperature range and substantially rigid (substantially non-pliable, substantially inflexible) in a second, lower temperature range. The second temperature range can be at or below normal body temperature and/or environmental temperatures experienced in normal situations (e.g., less than 120 degrees Fahrenheit, less than 60 degrees Celsius, preferably less than 50 C, more preferable less than 40 C and most preferably less than 30 C), such that the splint 900 remains in the second temperature range (and is therefore rigid) during normal wear of the splint 900 by a patient or during storage of the splint 900. The splint 900 can be heated into the first temperature range to make the splint 900 moldable, in which state the splint 900 can be molded (bent, conformed, etc.) into a desired shape. In the embodiments herein, the splint 900 becomes a flexible sheet- or tape-like member, such that it can be bent, conformed, etc. while substantially maintaining its thickness and continuous construction, which may be advantageous over use of a freely-reformable plaster or putty that could be sculpted in any dimension. FIGS. 9-14 show various desired shapes for the splint 900 in various embodiments while in a rigid state for immobilizing an ankle joint of a patient.

Figure 9:
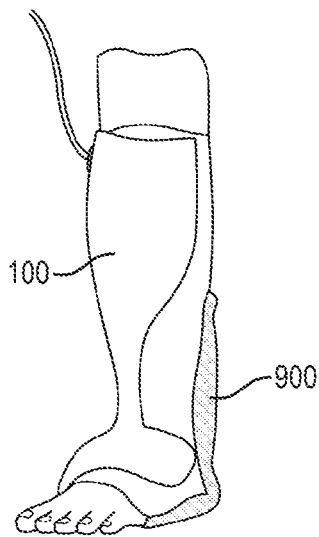
FIG. 9 is a perspective view of a first application of a heat-moldable splint applied over negative pressure dressing, according to an exemplary embodiment.

FIG. 9 shows a first application of the dressing 100 and the heat-moldable splint 900 to an ankle, according to an exemplary embodiment. The splint 900 is applied over the dressing 100, such that the dressing 100 separates the splint 900 from the patient's skin. In the example of FIG. 9, a half-posterior splint approach (configuration) is used. The splint 900 is positioned at a bottom side of the dressing 100 (i.e., a distal end of the patient's leg, sole of the patient's foot) and bent up to extend along a posterior side of the ankle (i.e., covering the patient's Achilles tendon). The splint 900 extends only partially up the posterior side of the patient's lower leg, for example such that the dressing 100 extends further up (e.g., approximately twice as far up) the posterior side of the patient's lower leg as the splint 900. The splint 900 is thereby formed in an approximate L-shape. The splint 900 can also be molded to conform to the dressing 100 such that the splint 900 also extends partially along lateral and medial sides of the ankle region, for example to partially cup the underside that the patient's foot.

The splint 900 can be coupled to the dressing 100 and/or the patient's ankle, such that, when the splint 900 is rigid, the ankle is substantially prevented from moving relative to the splint 900. For example, the splint 900 may be held in place by a feature of the dressing 900, for example a loop, strap, lacing, clip, hook-and-loop material, or other fastener to hold the splint 900 in place relative to the dressing 100 and the ankle. As another example, a separate strap or adhesive tape can be used to secure the splint 900 in place. As yet another example, the splint 900 can be conformed closely to the dressing 100 and the patient's anatomy such that the geometry of the splint relative to the geometry of the dressing 100 and the ankle (e.g., foot, leg, bony protrusions) prevents movement of the rigidified splint relative to the ankle, for example as an effect of the splint 900 wrapping at least partially up the lateral and medial sides of the patient's foot as shown in FIG. 9. Accordingly, when the splint 900 is cooled to become a rigid structure and is held in place relative to the patient's ankle, the splint 900 substantially immobilizes the patient's ankle.

Figure 10:
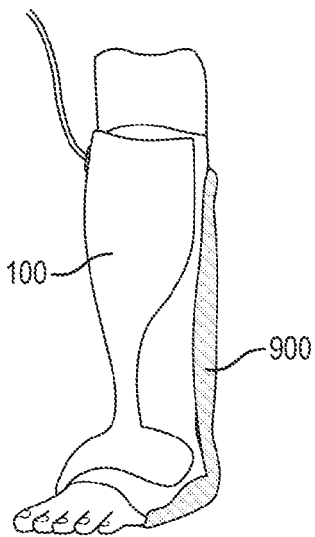
FIG. 10 is a perspective view of a second application of a heat-moldable splint applied over negative pressure dressing, according to an exemplary embodiment.

Referring now to FIG. 10, a second application of the splint 900 and the dressing 100 is shown. In the example of FIG. 10, a posterior splint approach is used. Relative to the example of FIG. 9 explained above, the splint 900 extends further up the posterior side of the patient's lower leg, for example to a point slightly below a top edge of the dressing 100. The splint 900 used in the example of FIG. 10 is longer than in the example of FIG. 9.

Figure 11:
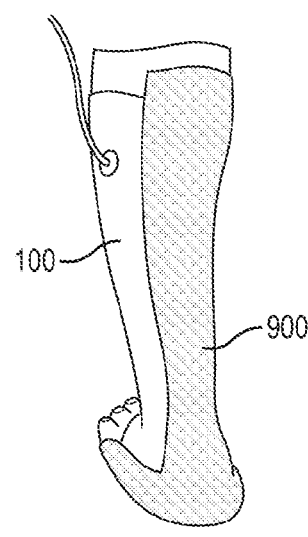
FIG. 11 is a perspective view of a third application of a heat-moldable splint applied over negative pressure dressing, according to an exemplary embodiment.

Referring now to FIG. 11, a third application of the splint 900 and the dressing 100 is shown. FIG. 11 is a rear perspective view of the ankle which shows the posterior side of the patient's lower leg with the dressing 100 and the splint 900 applied. FIG. 11 illustrates how the splint 900 can extend along the anterior side and distal end of the patient's leg, and to wrap at least partially around the lateral and medial sides of the patient's foot, for example to help secure the splint 900 in position relative to the patient's ankle. Relative to the example of FIG. 10, in the example of FIG. 10, in FIG. 11 an even longer splint 900 is used such that the splint 900 extends beyond the dressing 100 in a direction up the patient's leg. Accordingly, FIG. 10 illustrates that, in some embodiments, the splint 900 can be applied such that it both overlaps the dressing 100 at some portions of the splint 900 and wraps along the patient's skin at other portions of the splint 900. NOTE: I think we should consider illustrating a 3 part system of a splint, padding that may or may not come preapplied to the splint, and a dressing.

Figure 12:
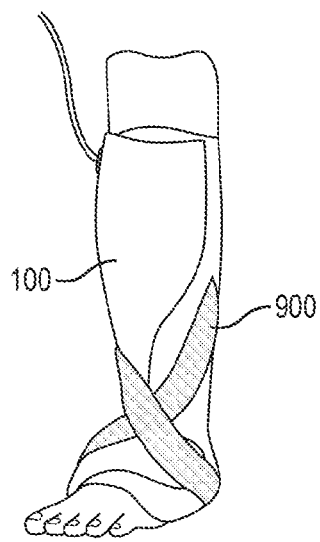
FIG. 12 is a perspective view of a fourth application of a heat-moldable splint applied over negative pressure dressing, according to an exemplary embodiment.

Referring now to FIG. 12, a fourth application of the splint 900 and the dressing 100 is shown, according to an exemplary embodiment. FIG. 12 shows the splint 900 applied in using a crisscross or X-splint approach. The splint 900 is shown as extending from a posterior side of the patient's lower leg, around the lateral side of the ankle, across a top of the patient's foot, downwardly around the medial side of the foot, across the bottom of the foot, upwardly around the lateral side of the foot, across the topside of the patient's foot while crossing (overlapping) itself, and up and around the medial side of the ankle to the posterior side of the lower leg of the patient. The splint 900 is therefore formed to go around a bottom, top, and back of the dressing 100 and the patient's ankle. In the crisscross application of FIG. 12, when cooled into a rigid state, the splint 900 is arranged to substantially immobilize the ankle joint and to hold itself in a substantially fixed position relative to the ankle.

Figure 13:
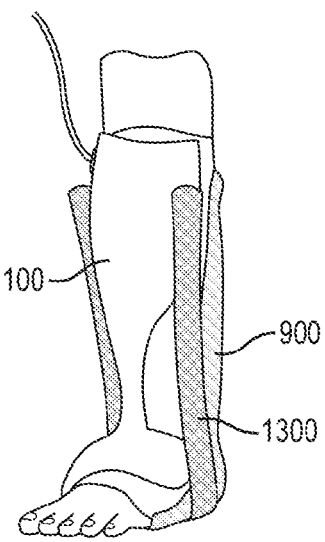
FIG. 13 is a perspective view of a fifth application of a heat-moldable splint applied over negative pressure dressing, according to an exemplary embodiment.

Referring now to FIG. 13, a combination saddle splint and posterior splint approach is used. As shown in FIG. 13, the splint 900 is used in combination with a second splint 1300. The second splint 1300 can be configured substantially the same as the splint 900. In some cases, the second splint 1300 is sized differently than the splint 900 (e.g., longer, narrower). As shown in FIG. 13, the splint 900 is applied in a posterior splint approach as shown in FIG. 10 and explained with reference thereto. The second splint 1300 is shown formed as a saddle splint, where the second splint extends down along the lateral side of the lower leg, under the patient's heel and up along the medial side of the lower leg. In the example shown, the second splint 1300 extends around the first splint, such that at the patient's heel the first splint 900 is between the second splint 1300 and the dressing 100. In other embodiments, the second splint 1300 is applied first such that the second splint 1300 is between the first splint 900 and the dressing 100. In other embodiments, an integrated splint is provided, for example having a cross- or t-like shape, such that a single continuous splint can be used to provide both the posterior-type splinting and the saddle-type splinting.

Figure 14:
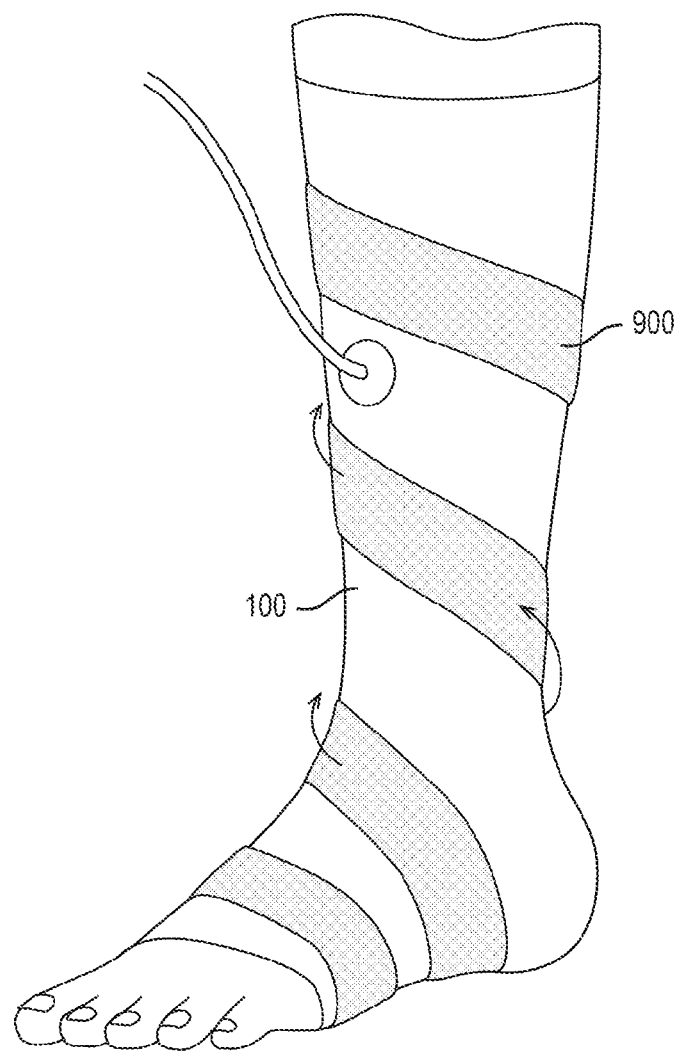
FIG. 14 is a perspective view of a sixth application of a heat-moldable splint applied over negative pressure dressing, according to an exemplary embodiment.
Figure 15:
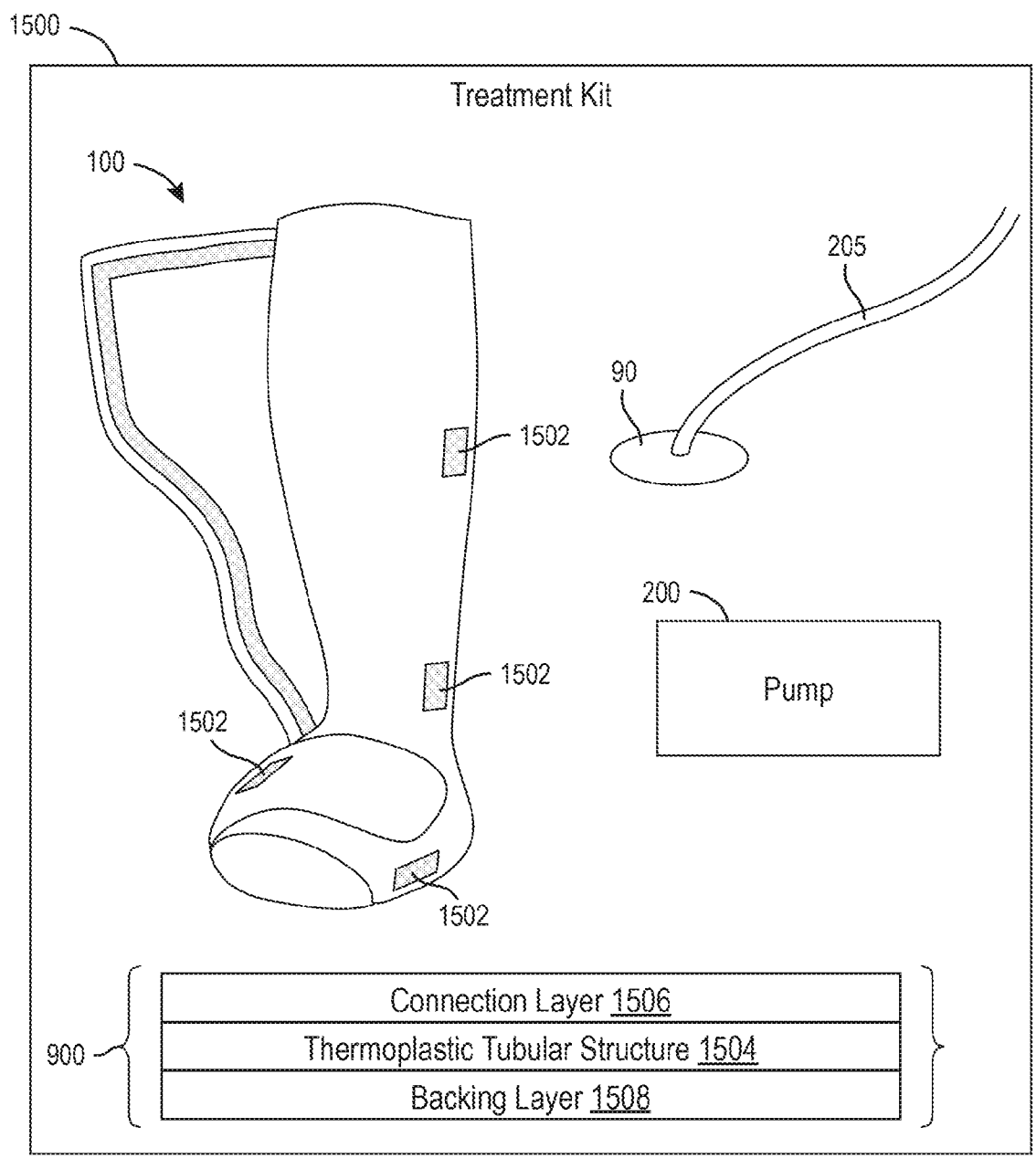
FIG. 15 is a diagram of a negative pressure and immobilization kit, according to an exemplary embodiment.

Referring now to FIG. 14, a fifth application of the splint 900 and the dressing 100 is shown. In the example of FIG. 14, the splint 900 is spiral-wound around the dressing 100 and the ankle while the ankle is in a preferred position for immobilization. As shown, the splint 900 wraps around the dressing 100 four times while also extending along the dressing 100 to form a spiral or helical shape. For example, the splint 900 is shown as wrapping around the foot twice and then extends to wrap around the lower leg twice. In other example applications, the splint 900 can include a different number of rotations around the dressing 100 and the patient's anatomy. In some embodiments, the dressing 100 includes markings or attachment features arranged in the spiral shape around the dressing 100 to guide a caregiver in applying the dressing in a spiral arrangement. In the spiral application of FIG. 14 and while rigid, the splint 900 is configured to hold itself in position relative to the dressing 100 and the patient's ankle.

FIGS. 11-14 thereby illustrate various example applications of the splint 900 over the dressing 100 to provide immobilization and negative pressure therapy to a patient's ankle. In various cases, the same splint 900 can be used in a variety of applications, for example as shown in FIGS. 11-14) depending on clinical needs, caregiver preferences, and/or patient preferences. In other embodiments, the splint 900 has a circumferential design such that the splint 900 can receive the patient's ankle and the dressing 100 and self-secure around the patient's ankle. For example, the splint 900 may have a shape similar to the shape of the dressing 100 shown in FIG. 8, in some embodiments. As another example, the splint 900 may be shaped as a sleeve or sock.

The dressing 100 and the splint 900 can provide complementary features to facilitate treatment. For example, the dressing 100, when drawn to a negative pressure, can itself provide resistance to mobilization of the joint. The dressing 100 can also be provided with attachment features to facilitate application of the splint 900 around the dressing 100 and the joint. Also, when positioned between the splint 900 and the joint, the dressing 100 can provide cushioning and comfortable patient-interface materials to provide for a comfortable interactions between the patient and the splint 900. Meanwhile, the immobilization of the joint by the splint 900 can help to reduce chances of leaks developing through the dressing 100 which may otherwise be caused by flexing and extension of a joint while the dressing 100 is worn by the patient, thereby improving the negative-pressure therapy applied to the joint using the dressing 100.

B. Treatment Kit for Negative Pressure and Immobilization Therapy

Referring now to FIG. 15, a schematic diagram of a treatment kit 1500 for negative pressure and immobilization therapy. The treatment kit 1500 can include various reusable and/or single-use components of a negative pressure and immobilization therapy system. In FIG. 15, the treatment kit 1500 is shown as including a dressing 100, a connector port 90, tubing 205, a pump 200, and a splint 900.

The dressing 100, connector port 90, tubing 205, and pump (air displacement device, negative pressure source) 200 can be configured as described above with reference to FIGS. 1-8C. In various embodiments, the dressing 100, connector port 90, tubing 205, and pump 200 can distributed as distinct, separate components, distributed as pre-coupled together, or some combination thereof. For example, as shown, the dressing 100 can be provided separately from the connector port 90, the tubing 205, and the pump 200, with the connector port 90 and tubing 205 shown as pre-coupled to one another. At the time of dressing application, the connector port 90 can be coupled to the dressing 100 and the tubing 205 can be connected to the pump 200 in order to setup the treatment kit 1500 for use in providing treatment to a patient. The dressing 100 is shown to includes attachment features 1502 (e.g., a hook or loop side of a hook & loop fastener) configured to facilitate attachment of the splint 900 to the dressing 100.

The kit 1500 is shown as including one splint 900. In other embodiments, multiple splints 900 are included. The splint 900 is configured to be applied as shown in FIGS. 9-14 or in a variety of other applications in various examples.

As shown in FIG. 15, the splint 900 is made up of multiple layers, shown as thermoplastic tubular structure 1504, connection layer 1506, and backing layer 1508. The thermoplastic tubular structure 1504 is configured to be easily moldable (flexible, conformable) when above a first temperature and substantially rigid below a second temperature, with the second temperature less than or equal to the first temperature, while the connection layer 1506 and the backing layer 1508 are coupled to the thermoplastic tubular structure 1504 to facilitate handling of the splint 900. The first temperature and/or the second temperature can be considered as a softening point or melting point of a material housed within the thermoplastic tubular structure 1504.

The thermoplastic tubular structure 1504 is made of thermoplastic tubes which are joined together in a netting or web, for example as shown in FIGS. 16-20 and described with reference thereto below. The thermoplastic tubes can made of a first thermoplastic, which holds its tubular form below a third temperature which is significantly higher than the first temperature. The netting or web of thermoplastic tubes can be flexible, including when below the first and/or second temperatures. The thermoplastic tubes can be made of a high melting thermoplastic elastomer such as Estane polyurethane. Hytrel elastomeric polyester, Kraton block copolymer and the like. The tubes can be filled with low melting polymer such as CAPA polycaprolactone.

The thermoplastic tubes hold (e.g., house, are substantially filled with) a second thermoplastic. The second thermoplastic can melt or partially melt above the second temperature and above the first temperature, so that the second thermoplastic is soft or liquid and therefore freely-moldable within the thermoplastic tubes above the first temperature. The second thermoplastic can harden into a rigid structure when below the second temperature, while being partially bendable (e.g., resistant to molding) between the first temperature and the second temperature. A softening or melting point of the tubular netting or web is higher than a softening or melting point of the second thermoplastic used to fill the tubes. Accordingly, the tubular netting or web (and the first thermoplastic) defines a structure for the thermoplastic tubular structure 1504, while the second thermoplastic within that tubular netting or web is determinative of whether the thermoplastic tubular structure 1504 is flexible or rigid at a given point in time.

Suitable thermoplastic polymers for use as the second thermoplastic within the netting or web are those polymers which soften or melt at temperatures which can comfortably be withstood by the patient and/or technician during application of the splint, but which are unlikely to be encountered during normal wear of the splint or during shipment and storage of the material. This temperature (referred to as the "first temperature" herein) may be approximately 90 degrees Celsius in some embodiments. In other embodiments, the first temperature is approximately 75 degrees Celsius, approximately 60 degrees Celsius, or between about 60 degrees Celsius and about 75 degrees Celsius. Suitable thermoplastic polymers include polyurethanes (especially polyurethanes based on semi-crystalline polyester polyols), polyethylene, ethylene vinyl acetate, cis- and trans-polyisoprene, polyesters such as polycaprolactone and the like. In the embodiments shown, the thermoplastic polymers used to fill the tubular structure are semi-crystalline polyesters, for example polycaprolactone and blends of polycaprolactone. These polymers may optionally contain one or more fillers. The filler may improve heat transfer and/or improve crystallization rates by nucleation. The polymers may also comprise one or more pigments or colorants.

This structure can be advantageous for several reasons. First, while the thermoplastic tubular structure 1504 is flexible and moldable above the first temperature, the tubular webbing or netting preserves the overall form (e.g., a sheet-like form) by confining the degrees of freedom in which the thermoplastic tubular structure 104 is moldable, thereby enabling a high degree of flexibility without compromising the overall structure to facilitate application. Second, the thermoplastic tubular structure 1504 can provide a large surface area across which the internal (second) thermoplastic can absorb or release heat, thereby reducing the time taken to heat the thermoplastic tubular structure 1504 to above the first temperature (i.e., to a moldable state due to application of a heat source) and the time over which the thermoplastic tubular structure 1504 can cool to below the softening point of the second thermoplastic (e.g., by losing heat to ambient air). Various other advantages are also provided.

In the embodiment of FIG. 15, the connection layer 1506 is coupled to the thermoplastic tubular structure 1504. The connection layer 1506 is configured to provide for coupling of the splint 900 to the dressing 100 and/or to provide coupling of the splint 900 to other portions of the splint 900 (e.g., when circumferentially applied around a patient structure). For example, the connection layer 1506 may be configured to interface with the attachment features 1502 of the dressing 100. As one example, the connection layer 1506 can include the "hook" side of hook-and-loop fastener, while the attachment features 1502 of the dressing includes the "loop" side, such that the connection layer 1506 can be selectively and removeably coupled to the attachment features 1502. Snaps, buckles, clips, loops, adhesive, zippers, etc. can be used in various embodiments for the connection layer 1506 and the attachment features 1502. The connection layer 1506 of the splint 900 and the attachment features 1502 of dressing 100 can thereby interact to hold the splint 900 on the dressing 100 while in a moldable state, thereby allowing the splint 900 to cool to a rigid state in position as applied. In some embodiments, the connection layer 1506 includes padding configured to provide a comfortable interface between the thermoplastic tubular structure 1504 and the dressing 100 and/or the patient. Padding may also be provided as a separate component in the kit 1500.

In some embodiments, the kit includes additional components. For example, the kit may include a heat source configured for heating the splint 900 to prepare the splint 900 for application. In some embodiments, the heat source is a chemical heat source configured to undergo an exothermic reaction that releases sufficient thermal energy to heat the splint 900 to a moldable state. In some embodiments, the heat source is an electric heater, for example a hair-dryer-type device including an electric heating coil and a fan arranged to blow air across the electric heating coil and onto the splint 900. In other embodiments, the kit includes a steamer device configured to heat water into steam and force the steam towards the splint 900 to heat the splint 900. In other embodiments, the kit includes an infrared light source or other device for irradiating the splint 900 with light energy that can cause the splint 900 to increase in temperature. In some such embodiments, the splint 900 can include materials selected for their ability to absorb infrared radiation. In other embodiments, the kit includes instructions on how to properly heat the splint 900 in a microwave oven or other oven (e.g., a "cook" time, power level). In some such embodiments, the splint 900 can include materials chosen for their ability to absorb microwave radiation. Optionally, the material may contain a microwave susceptor or be placed on microwave susceptor packaging.

The kit 1500 thus includes various components that can be used together and interoperate to provide negative pressure and immobilization therapy. In some embodiments, the components of the kit 1500 are reusable for application to multiple patients or to the same patient at different times. In other embodiments, one or more of the components of the kit 1500 are disposable and can be replaced after each use. The kit 1500 can include one or more of each components as may be suitable for users, for example including a first splint 900 and a second splint 1300 to allow for the application shown in FIG. 13.

In alternative embodiments, the splint 900 is integrated into the dressing 100, for example permanently coupled to the occlusive layer of the dressing 100. In some cases, the splint is positioned beneath the occlusive layer, for example between the occlusive layer 110 and the decompression layer 120 shown in FIG. 3. The whole dressing 100 can then be heated to allow for molding of the splint 900. The splint 900 can be coextensive with the decompression layer 120 or can be selectively shaped to provide a desired immobilization effect while allowing flexibility of the dressing in other areas. Various such embodiments are within the scope of the present disclosure.

C. Tubular Web Structures for a Heat-Moldable Splint

Referring generally to FIGS. 16-20, several embodiments of the tubular netting or web that can make up the thermoplastic tubular structure 1504 are shown. In some embodiments, of the thermoplastic tubular structure 1504, one of the nettings or webs of FIGS. 16-20 is used. In other embodiments, two or more nettings or webs are layered or otherwise coupled together to for the thermoplastic tubular structure 1504.

Figure 16:
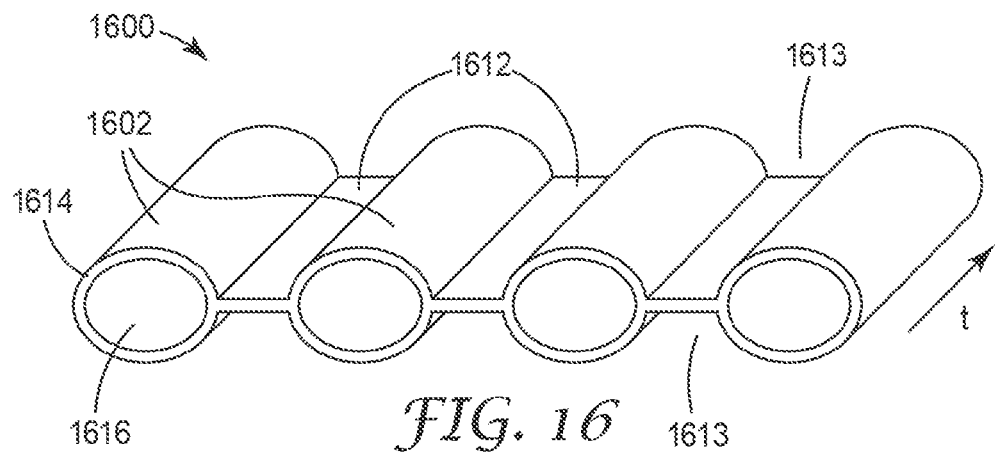
FIG. 16 is a schematic cross-sectional view of a first coextruded polymeric article that can be included in a heat-moldable splint, according to an exemplary embodiment.

Referring now to FIG. 16, exemplary web 1600 comprises array of discrete polymeric tubes 1602. Spacer segments 1612 are between adjacent polymeric tubes 1602. These spacer segments are formed at the same time as the tubes and are welded together with the tubes to form a continuous web. Spacer segments provide uniform arrangement and spacing of tubing. Areas 1613 are formed between adjacent tubes. In some embodiments the areas 1613 above and below the spacer segments may be filled with thermally conductive materials (i.e., materials having a thermal conductivity of at least 0.5 watt per meter kelvin). Spacer segments 1612 may enable a large portion of tube perimeter to be in contact with thermally conductive material. In some embodiments, the portion of tube perimeter accessible for heat transfer as high as 60 percent of the perimeter, in some cases greater than 80%. Polymeric tubes 1602 can be hollow polymeric tubes (i.e., a hollow core 1616 with a sheath 1614 surrounding the hollow core). The hollow core 1616 can be filled with a thermoplastic polymer (i.e., the second thermoplastic polymer described above). As shown in FIG. 16, web 1600 can be a continuous web. As shown in exemplary web 1600 of FIG. 16, polymeric tubes 1602 are within the same plane.

Figure 17:
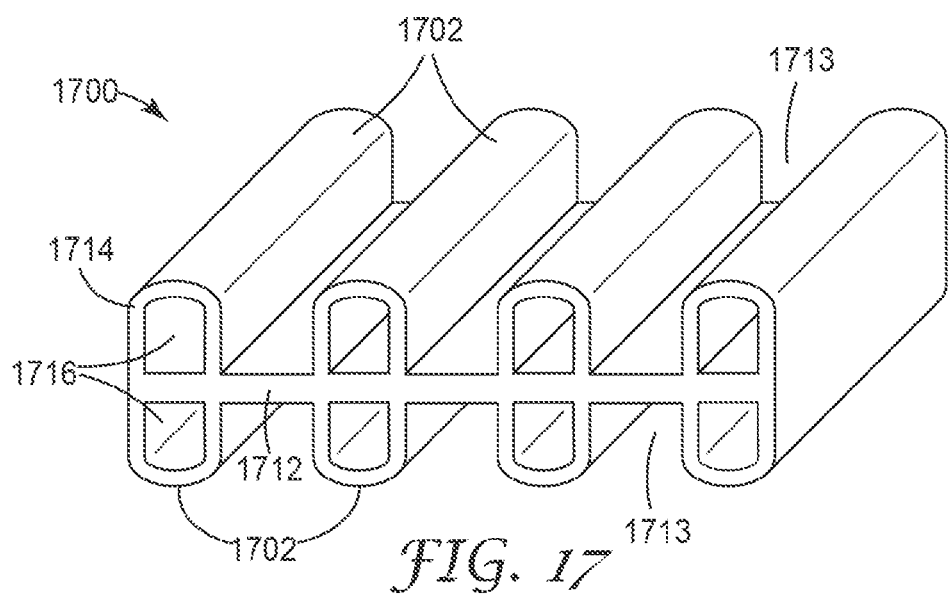
FIG. 17 is a schematic cross-sectional view of a second coextruded polymeric article that can be included in a heat-moldable splint, according to an exemplary embodiment.

Referring to FIG. 17, exemplary web 1700 comprises array of discrete polymeric tubes 1702. Space segments 1712 are between adjacent polymeric tubes 1702. These spacer segments are formed at the same time as the tubes and are welded together with the tubes to form a continuous web. Spacer segments provide uniform arrangement and spacing of tubes. Areas 1713 are formed between adjacent tubes. In some embodiments the areas 1713 above and below the connecting spacer segments may be filled with thermally conductive materials (i.e., materials having a thermal conductivity of at least 0.5 watt per meter kelvin). Spacer segments 1712 enable a large portion of tube perimeter to be in contact with thermally conductive material. In some embodiments the portion of tube perimeter accessible for heat transfer as high as 60 percent of the perimeter, in some cases greater than 80%. Polymeric tubes 1702 can be hollow polymeric tubes (i.e., a hollow core 1716 with a sheath 1714 surrounding the hollow core). The hollow core 1716 can be filled with a thermoplastic polymer (i.e., the second thermoplastic polymer described above). As shown in FIG. 17, web 1700 can be a continuous web. As shown in exemplary web 1700 of FIG. 17, polymeric tubes 1702 are within two planes. In some other embodiments, polymeric tubes 1702 can be within more than two planes.

Figure 18:
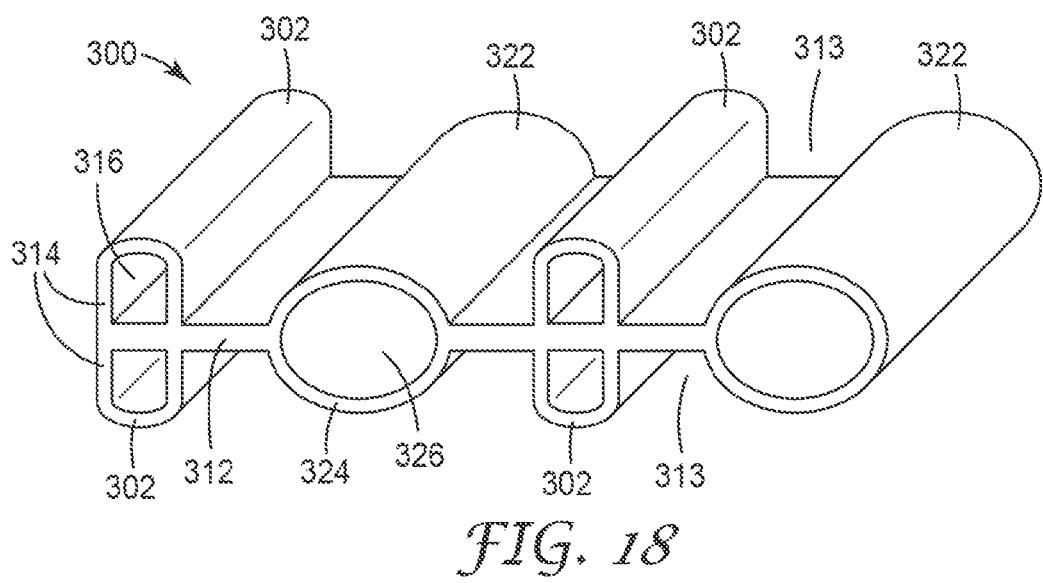
FIG. 18 is a schematic cross-sectional view of a third coextruded polymeric article that can be included in a heat-moldable splint, according to an exemplary embodiment.

Referring to FIG. 18, exemplary web 300 comprises a first array of discrete polymeric tubes 302 and a second array of discrete polymeric tubes 322. In some embodiments, discrete polymeric tubes 302 and 322 are alternatively spaced. For example, one polymeric tube 322 is in between two polymeric tubes 302. Space segments 312 are between adjacent polymeric tube 302 and 322. These spacer segments are formed at the same time as the tubes and are welded together with the tubes to form a continuous web. Spacer segments provide uniform arrangement and spacing of tubing.

Areas 313 are formed between adjacent tubes. In some embodiments the areas 313 above and below the connecting spacer segments may be filled with thermally conductive materials (i.e., materials having a thermal conductivity of at least 0.5 watt per meter kelvin). Spacer segments 312 enable a large portion of a tube perimeter to be in contact with thermally conductive material. In some embodiments the portion of tube perimeter accessible for heat transfer as high as 60 percent of the perimeter, in some cases greater than 80%. Polymeric tubes 302 and 322 can be hollow polymeric tubes (i.e., a hollow core 316 or 326 with a sheath 314 or 324 surrounding the hollow core). The hollow core 316 can be filled with a thermoplastic polymer (i.e., the second thermoplastic polymer described above). As shown in FIG. 18, web 300 can be a continuous web. As shown in exemplary web 300 of FIG. 18, the cross-section of polymeric tubes 302 and 322 have different shapes. In some other embodiments, the cross-section of polymeric tubes 302 and 322 can have the same shapes.

Embodiments of webs described herein can be made, for example, by a method including providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims. The repeating sequence may include shims that provide a fluid passageway between the second cavity and a second plurality of orifices, and shims that provide a fluid passageway between the first cavity to a first plurality of enclosed polygon shaped orifices, and also that provide a third passageway extending from a third cavity to a third plurality of orifices located within the enclosed polygon orifice area. The method may also include dispensing first polymeric tubes from the first dispensing orifices while simultaneously dispensing spacer segments from the second dispensing orifices, and providing an open air passageway for the third cavity and the third dispensing orifices. In some embodiments, the third passageway is filled with air or gas and free of other material. In some embodiments, dispensing filler material (e.g., a fluid) from the third dispensing orifices.

Embodiments of webs described herein can be made, for example by a method that includes providing an extrusion die comprising an array of orifices positioned close to one another such that material dispensed from the orifices welds together once they exit the orifices, wherein a first die cavity is connected to a plurality of enclosed polygon shaped orifices, a second die cavity is connected to a plurality of spacer orifices, and a third cavity is connected to a third plurality of orifices located within the enclosed polygon orifice area. The method can also include dispensing first polymeric tubes from the first dispensing orifices while simultaneously dispensing spacer segments from the second dispensing orifices, and providing an open air passageway for the third cavity and the third dispensing orifices. In some embodiments, the first dispensing orifices and the second dispensing orifices are collinear. In some embodiments, the first dispensing orifices are collinear, and the second dispensing orifices are also collinear but offset from and not collinear with the first dispensing orifices.

In some embodiments, extrusion dies are used to manufacture the webs described herein and include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or both, of the cavities. In some embodiments, the shims will be assembled according to a plan that provides a repeating sequence of shims of diverse types. The repeating sequence can have diverse numbers of shims per repeat.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the distal opening within, for example, a repeating sequence of shims, may be identical or different. For example, the portion of the distal opening provided by the shims that provide a conduit between the first cavity and a first dispensing orifice could be narrower than the portion of the distal opening provided by the shims that provide a conduit between the second cavity and a second dispensing orifice.

In some embodiments, the assembled shims (conveniently bolted between the end blocks) also include a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

Typically, the passageway between cavity and dispensing orifice is up to 5 mm in length. Sometimes the first array of fluid passageways has greater fluid restriction than the second array of fluid passageways.

In some embodiments, for extrusion dies, each of the dispensing orifices of the first and the second arrays have a cross sectional area, and each of the dispensing orifices of the first arrays has an area different than that of the second array. The shims for dies may have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to tubes extruding at an angle out of the die which inhibits desired bonding of the net. To aid in alignment, an alignment key can be cut into the shims. Also, a vibrating table can be useful to provide a smooth surface alignment of the extrusion tip.

Further details of such shims, dies, methods, etc. for manufacturing the web designs described with reference to FIGS. 16-18, for use with the heat-moldable splints and negative pressure therapy kits described herein, are described in detail in U.S. Provisional Patent Application No. 62/885,523, filed Aug. 12, 2019, the disclosure of which is incorporated by reference herein in its entirety.

Figure 19:
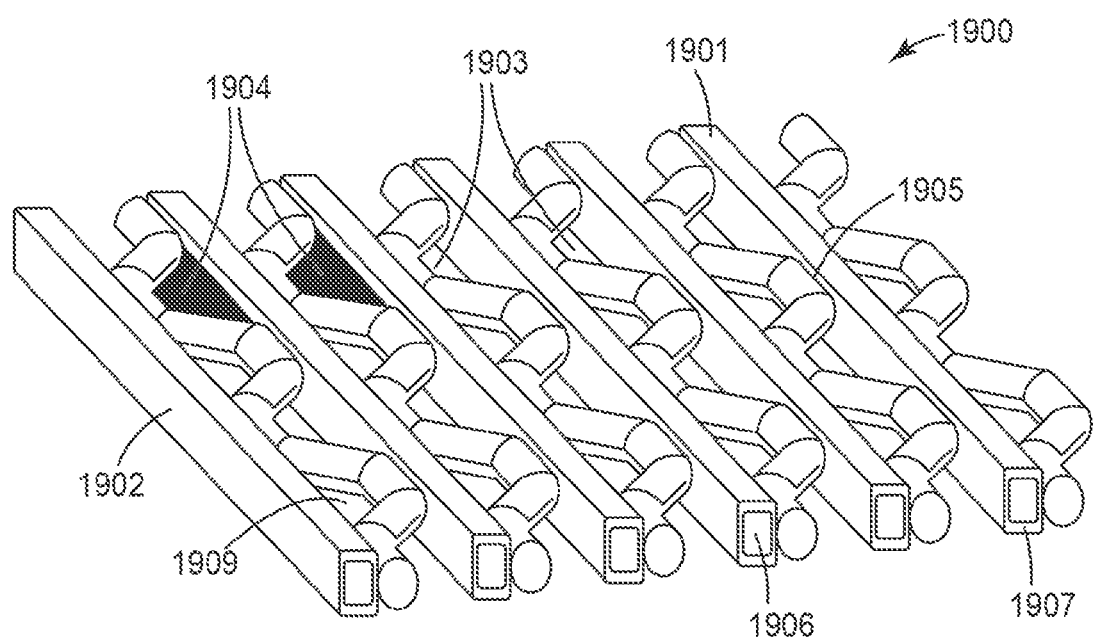
FIG. 19 a schematic cross-sectional view of a fourth coextruded polymeric article that can be included in a heat-moldable splint, according to an exemplary embodiment.

Referring to FIG. 19, exemplary netting 1900 comprises array 1901 of polymeric strands 1902. Polymeric strands 1902 are periodically joined together at bond regions 1905 throughout array 1901 with spaces 1903 between adjacent strands (i.e., between bond regions the bonded strands for each respective bond region are separated). As shown, at least some of spaces 1903 are filled with thermally conductive materials (i.e., materials having a thermal conductivity of at least 0.5 watt per meter kelvin) 1904. At least a plurality (i.e., at least two) of strands 1902 are hollow polymeric strands (i.e., a hollow core 1906 with a sheath 1907 surrounding the hollow core). The hollow core 1906 can be filled with a thermoplastic polymer (i.e., the second thermoplastic polymer described above). Strands 1902 do not substantially cross over each other (i.e., at least 50 percent by number do not cross over each other). Netting 1900 comprises openings 1909. In some embodiments, openings 1909 are at least one of hexagonal-shaped or diamond shaped.

In the example of FIG. 19, bonds are formed when two adjacent molten polymer strands collide with each other. Adjacent strands are extruded at alternating speeds such that adjacent molten strands continually collide, forming bonds, and then part, forming the net openings. Strands are extruded in the same direction, and thus, these bonds are parallel bonds, all formed in the same direction. The bonds are in the same plane and are show as not crossing over each other. For a given strand, there is a first strand on one side which intermittently bonds, and a second strand on the opposite side which is also intermittently bonded. Bond regions are continuations of the two strands, and thus the bond region includes the sum of the two adjacent strands. Typically, strands continue without disconnect and can be followed continuously through the bond regions.

Netting embodiments like the netting 1900 of FIG. 19 can be made, for example by a method that includes providing an extrusion die comprising a plurality of shims positioned adjacent to one another, the shims together defining at least a first cavity, a second cavity, and a third cavity, and a dispensing surface, wherein the dispensing surface has an array of alternating dispensing orifices. The plurality of shims may include a plurality of a repeating sequence of shims. The repeating sequence may include shims that provide a fluid passageway between the first cavity and a first plurality of orifices, shims that provide a second passageway extending from the second cavity to a second plurality of enclosed polygon shaped orifices, and shims that provide a third passageway extending from a third cavity to a third plurality of orifices located within the enclosed polygon area of the second plurality of orifices. The method may include dispensing first polymeric strands from the first dispensing orifices at a first strand speed while simultaneously dispensing second polymeric strands from the second dispensing orifices at a second strand speed. In some embodiments, the first strand speed is at least 2 (in some embodiments, in a range from 2 to 6, or even 2 to 4) times the second strand speed to provide the netting. In some embodiments, the third passageway is filled with air and free of material. In some embodiments, the method includes dispensing filler material (e.g., a fluid) from the third dispensing orifices.

In some embodiments, nettings like the netting 1900 of FIG. 19 can be made, for example by a method that includes providing an extrusion die comprising a plurality of shims positioned adjacent to one another. The shims together define at least a first cavity, a second cavity, and a third cavity, and a dispensing surface. The dispensing surface has an array of alternating dispensing orifices and the plurality of shims include a plurality of a repeating sequence of shims. The repeating sequence may include shims that provide a fluid passageway between the first cavity and a first plurality of orifices, shims that provide a second passageway extending from the second cavity to a second plurality of enclosed polygon shaped orifices, and shims that provide a third passageway extending from a third cavity to a third plurality of orifices located within the enclosed polygon area of the second plurality of orifices. The method may include dispensing first polymeric strands from the first dispensing orifices at a first strand speed while simultaneously dispensing second polymeric strands from the second dispensing orifices at a second strand speed and a fluid from the third dispensing orifices. In some embodiments, the first strand speed is at least 2 (in some embodiments, in a range from 2 to 6, or even 2 to 4) times the second strand speed to provide the netting.

In some embodiments, the plurality of shims includes a plurality of at least one repeating sequence of shims that includes shims that provide a passageway between a first and second cavity and the first dispensing orifices. In some of these embodiments, there will be additional shims that provide a passageway between the first and/or the second cavity, and/or a third (or more) cavity and second dispensing orifices. Typically, not all of the shims of dies described herein have passageways, as some may be spacer shims that provide no passageway between any cavity and a dispensing orifice. In some embodiments, there is a repeating sequence that further comprises at least one spacer shim. The number of shims providing passageway to the first dispensing orifices may be equal or unequal to the number of shims providing a passageway to the second dispensing orifices.

In some embodiments, the first dispensing orifices and the second dispensing orifices are collinear. In some embodiments, the first dispensing orifices are collinear, and the second dispensing orifices are also collinear but offset from and not collinear with the first dispensing orifices.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, other alternatives for assembling the extrusion die are possible. In some embodiments, the at least one end block has an inlet port for introduction of fluid material into one, or both, of the cavities.

In some embodiments, the shims will be assembled according to a plan that provides a repeating sequence of shims of diverse types. The repeating sequence can have diverse numbers of shims per repeat. For example, a twenty seven shim repeating sequence can provide a netting with a single-material strand alternating with a core/sheath strand.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the distal opening within, for example, a repeating sequence of shims, may be identical or different. For example, the portion of the distal opening provided by the shims that provide a conduit between the first cavity and a first dispensing orifice could be narrower than the portion of the distal opening provided by the shims that provide a conduit between the second cavity and a second dispensing orifice.

In some embodiments, the assembled shims (conveniently bolted between the end blocks) further comprise a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

In some embodiments, with respect to extrusion dies described herein and associated with the embodiment of FIG. 19, each of the dispensing orifices of the first and the second arrays have a width, and each of the dispensing orifices of the first and the second arrays are separated by up to 2 times the width of the respective dispensing orifice. Typically, the passageway between cavity and dispensing orifice is up to 5 mm in length. Sometimes the first array of fluid passageways has greater fluid restriction than the second array of fluid passageways.

In some embodiments, for extrusion dies described herein and associated with the embodiment of FIG. 19, each of the dispensing orifices of the first and the second arrays have a cross sectional area, and each of the dispensing orifices of the first arrays has an area different than that of the second array. Typically, the spacing between orifices is up to 2 times the width of the orifice. The spacing between orifices is greater than the resultant diameter of the strand after extrusion. This diameter is commonly called die swell. This spacing between orifices is greater than the resultant diameter of the strand after extrusion leads to the strands repeatedly colliding with each other to form the repeating bonds of the netting. If the spacing between orifices is too great the strands will not collide with each other and will not form the netting.

The shims for dies described herein and associated with the embodiment of FIG. 19 typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

Further details of such shims, dies, methods, etc. for manufacturing the netting designs described with reference to FIG. 19, for use with the heat-moldable splints and negative pressure therapy kits described herein, are described in detail in U.S. Provisional Patent Application No. 62/808,620 filed 21 Feb. 2020, and PCT App. No. IB2020/051315, filed 12 Feb. 2020, the entire disclosures of which are incorporated by reference herein.

Figure 20:
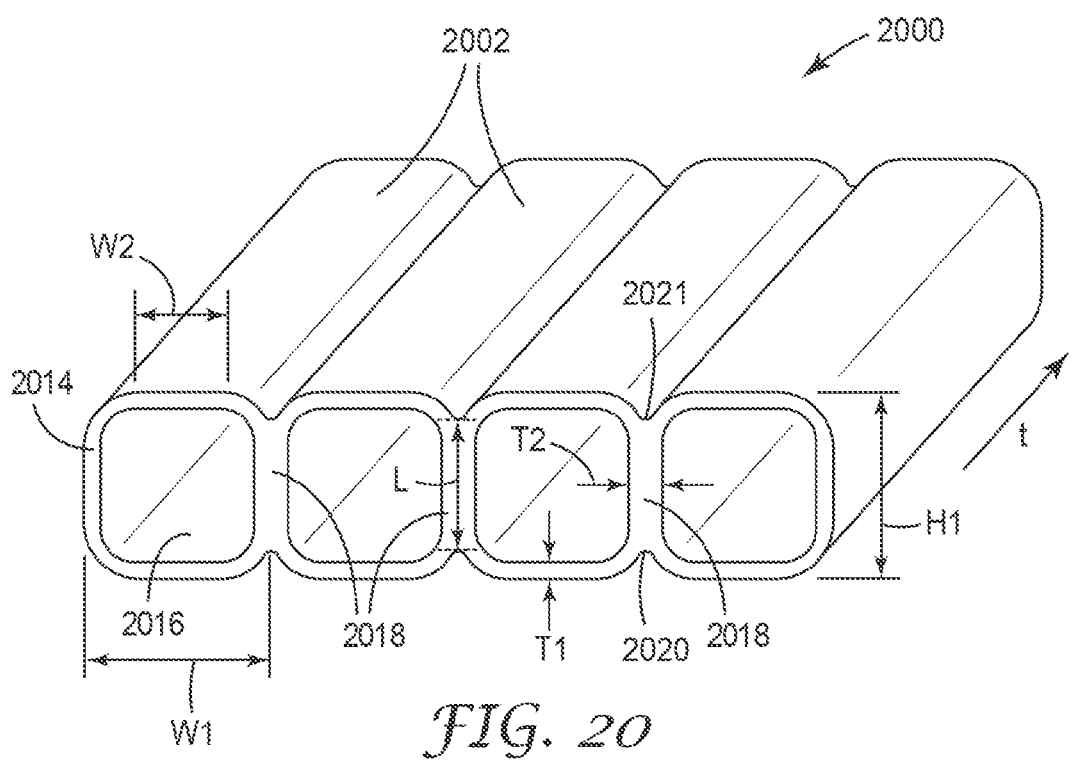
FIG. 20 is a schematic cross-sectional view of a fifth coextruded polymeric article that can be included in a heat-moldable splint, according to an exemplary embodiment.

Referring to FIG. 20, exemplary web 2000 comprises array of discrete polymeric tubes 2002. Polymeric tubes 2002 can be hollow polymeric tubes (i.e., a hollow core 2016 with a sheath 2014 surrounding the hollow core 2016). In some embodiments, the hollow cross-sectional area of the tubes with hollow cross-sectional area is greater than 50%, 60%, 70% or 80% of the area between the top and bottom surface of the web. Adjacent polymeric tubes 2002 are connected at bond regions 2018. The length L of bond regions 2018 is more than 5% of the average diameter of polymeric tubes 2002. In general, the length L of the bond region creates a more rectilinear tubular opening of adjacent connected tubes when the bond length is longer.

Rectilinear shapes with round corners, such as squircles, result in hollow cross sectional areas which have a greater portion of the area between the top and bottom surface of the web as compared to circular shapes which are bonded together at only a tangent point. Short bond lengths L create tubular shapes which are more oval in shape. These squircle shapes can also be extruded onto flat quench surfaces to create flat top or bottom segments of the squircle shape. Rectilinear shaped squircles enable larger contact area to the top and bottom planar surfaces than that of circular shaped tubes. This larger contact area can be useful for heat transport between the top or bottom surface and a cooling media inside the tubes.

In some embodiments, the bond region has a length L of a range from 0.1 mm to 5 mm. In some embodiments, the thickness T2 of the bond region is substantially uniform along its length. As shown in exemplary web 2000 of FIG. 1, the cross-section of polymeric tubes 2002 have the same shapes. In some other embodiments, the cross-section of polymeric tubes 2002 can have different shapes. The cross-section of polymeric tubes 2002 can be any suitable shapes, for example, a squircle. The polymeric tubes 2002 have a tube wall thickness T1 in a range from 0.025 to 0.25 mm. Adjacent polymeric tubes have a first bond point 2020 and second bond point 2021, and the bond point has a radius more than 0.1 T1, 0.2 T1, 0.3 T1, 0.4 T1, or 0.5 T1. These bond points represent the beginning and ending of the bond region between adjacent tubes. As such, they are the beginning point and the end point of the bond line shown as length L in FIG. 1. The bond point with the adjacent tube walls creates the radius at the ends of the bond length. Bond points with radiuses provide crack propagation resistance between tubes. In some embodiments the strength of the bond or weld between tubes is greater than the strength of the wall T1 of the tubes.

As shown in FIG. 20, web 2000 can be a continuous web. As shown in exemplary web 2000 of FIG. 1, polymeric tubes 2002 are within the same plane. FIG. 1 shows individual tube width W1 and individual tube height H. Squircle shaped tubes have flat surfaces on the top and bottom surface of the web. Dimension W2 and dimension t shown in FIG. 1 can be used to determine contact area of squircle shaped tubular webs. Surface contact area as a percentage can be calculated by comparison of dimension W1 vs W2, shown in FIG. 1. In some embodiments the contact area of the top and bottom surface of the squircle shaped web 30 can be up to 10%, up to 25%, 50% or even up to 95% of the top or bottom planar surface area. In some embodiments, webs described herein have a height H1 up to 5,000 (in some embodiments, up to, 2,00, 1,000, 500, or even up to 100; in a range from 100 to 5,000, 100 to 2,000, 100 to 1,000, or even 100 to 500) micrometers. In some embodiments, the polymeric tubes have an average cross-sectional diameter in a range from 0.1 to 5 mm. In some embodiments the thickness T2 is twice the thickness T1. In some embodiments the thickness T1 is uniform around the perimeter of the tube. In some embodiments the thickness T1 is varied to assist in formation of desired tubular shapes. In some embodiments, at least 25 (in some embodiments, at least 30, 35, 40, 45, 50, 55, 60, 65, 70, 75, 80, 85, 90, 95, or even 100) percent by number hollow polymeric tubes each have a hollow cross-sectional area in a range from 0.1 to 10 (in some embodiments, in a range from 0.1 to 2, or even 0.1 to 5) mm2.

In some embodiments, the polymer comprises a filler material (e.g., aluminum oxide, aluminum nitride, aluminum trihydrate, boron nitride, aluminum, copper, graphite, graphene, magnesium oxide, zinc oxide) to provide thermal conductivity. In some embodiments, the array of polymeric tubes exhibits at least one of oval-shaped, or squircle-shaped cross section, openings. In some embodiments, the polymeric tubes have a down web direction, for example t direction as shown in FIG. 20 and a cross-web direction. The polymeric tubes are shown as extending substantially in a down-web direction.

The webs thereby provide sheathed cores of the second thermoplastic polymer, which may be a fluid or solid depending on temperature. In some embodiments, at least some of tubes of web described herein are filled with thermally conductive material (i.e., materials having a thermal conductivity of at least 0.5 watts per meter kelvin). Exemplary thermally conductive materials include functional particles of (e.g., aluminum oxide, aluminum nitride, aluminum trihydrate, boron nitride, aluminum, copper, graphite, graphene, magnesium oxide, zinc oxide) to provide desired thermal properties to articles described herein. Additional information that may be useful in making and using tubes described therein, when combined with the instant disclosure, can be found in WO 2020/003065 A1 (Ausen et al.), the disclosure of which is incorporated herein by reference.

Embodiments of webs described herein with reference to FIG. 20 can be made, for example, by a method that includes providing an extrusion die comprising a plurality of shims positioned adjacent to one another. The shims together define at least a first cavity, a second cavity, and a third cavity. The extrusion die can also include a dispensing surface, wherein the dispensing surface has an array of alternating dispensing orifices. The plurality of shims includes a plurality of a repeating sequence of shims, wherein the repeating sequence includes shims that provide a fluid passageway between the first cavity to a first plurality of enclosed polygon shaped orifices, and also that provide a second passageway extending from a second cavity to a second plurality of orifices located within the enclosed polygon orifice area. The method may include dispensing first polymeric tubes from the first dispensing orifices and providing an open air passageway for the second cavity and the second dispensing orifices.

In some embodiments, the second passageway is filled with air or gas and free of other material. In some embodiments, the method includes dispensing filler material (e.g., a fluid) from the second dispensing orifices.

Embodiments of webs described herein with reference to FIG. 20 can be made, for example, using a method that includes providing an extrusion die comprising an array of orifices positioned close to one another such that material dispensed from the orifices welds together once they exit the orifices. The adjacent orifice regions may be approximately parallel to each other. A first die cavity may be connected to a plurality of enclosed polygon shaped orifices, and a second cavity may be connected to a second plurality of orifices located within the enclosed polygon orifice area. The method may include dispensing first polymeric tubes from the first dispensing orifices, and providing an open air passageway for the second cavity and the second dispensing orifices.

In some embodiments, the first dispensing orifices and the second dispensing orifices are collinear. In some embodiments, the first dispensing orifices are collinear, and the second dispensing orifices are also collinear but offset from and not collinear with the first dispensing orifices. In some embodiments the orifice thickness is uniform around the orifice shape. In some embodiments the orifice thickness is different on different sides of the orifice shape. In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or both, of the cavities.

In some embodiments, the shims will be assembled according to a plan that provides a repeating sequence of shims of diverse types. The repeating sequence can have diverse numbers of shims per repeat. Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the distal opening within, for example, a repeating sequence of shims, may be identical or different. For example, the portion of the distal opening provided by the shims that provide a conduit between the first cavity and a first dispensing orifice could be narrower than the portion of the distal opening provided by the shims that provide a conduit between the second cavity and a second dispensing orifice.

In some embodiments, the assembled shims (conveniently bolted between the end blocks) further comprise a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity. Typically, the passageway between cavity and dispensing orifice is up to 5 mm in length.

Sometimes the first array of fluid passageways has greater fluid restriction than the second array of fluid passageways. The shims for dies described herein with reference to FIG. 20 typically have thicknesses in the range from 50 micrometers to 125 micrometers, although thicknesses outside of this range may also be useful. Typically, the fluid passageways have thicknesses in a range from 50 micrometers to 750 micrometers, and 30 lengths less than 5 mm (with generally a preference for smaller lengths for decreasingly smaller passageway thicknesses), although thicknesses and lengths outside of these ranges may also be—8—useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to tubes extruding at an angle out of the die which inhibits desired bonding of the net. To aid in alignment, an alignment key can be cut into the shims. Also, a vibrating table can be useful to provide a smooth surface alignment of the extrusion tip.

Further details of such shims, dies, methods, etc. for manufacturing the web designs described with reference to FIG. 20, for use with the heat-moldable splints and negative pressure therapy kits described herein, are described in detail in U.S. Provisional Patent Application No. 63/035,970, filed Jun. 8, 2020, the disclosure of which is incorporated by reference herein in its entirety.

D. Methods of Making and Using a Negative Pressure Therapy System with a Heat Moldable Splint Referring now to FIG. 21, a flowchart of a process 2100 for manufacturing a heat-moldable splint 900 is shown, according to an exemplary embodiment.

At step 2102, a tubular web or netting is extruded. The tubular web or netting can be the web 1600, web 1700, web 1800, netting 1900, or web 2000 described above with reference to FIGS. 16-20. The extrusion process can also be executed as described above with reference to FIGS. 16-20. A tubular web or netting can thereby be obtained, which forms multiple hollow tubes coupled together and which is substantially flexible and conformable. The tubular web or netting can be sized and shaped in the desired final size and shape for the splint 900, for example in a substantially rectangular shape, or may be substantially larger (e.g., formed in a substantially continuous sheet or in a section larger than the final size and shape for the splint 900.

At step 2104, the hollow tubes of the tubular web or netting are at least partially filled with a thermoplastic polymer different than the material used to make the tubular web or netting. For example, a first thermoplastic polymer can be used to form the tubular web or netting, while a second thermoplastic polymer can be used to at least partially fill the tubes of the tubular web or netting. Step 2104 can be formed with the second thermoplastic polymer above a melting point, such that the second thermoplastic polymer is a liquid and thus flows through the tubes to fill the tubes. The tubular web or netting has a higher melting point than the polymer inserted therein to facilitate this process. In other embodiments of step 2104, the tubular web or netting are filled with the polymer as they are being extruded so that the two materials are formed together during an extrusion process in order to at least partially fill the tubes with the thermoplastic polymer.

At step 2106, the filled tubular webbing is cut to an appropriate size. This can include sealing one or more open ends of the tubular web or netting in order to contain the second thermoplastic polymer within the tubes. In some embodiments, step 2106 include coupling multiple sections of tubular webbing together, for example face-to-face to create a multi-layered tubular webbing. The thermoplastic tubular structure 1504 can thereby be produced.

At step 2108, a backing material (e.g., backing layer 1508), handling features, connection features (e.g., connection layer 1506) or other additional components of the splint 900 in various embodiments are coupled to the filled tubing (i.e., to the thermoplastic tubular structure 1504. In some embodiments, the backing material is adhered to one face of the thermoplastic tubular structure 1504 and the connection layer 1506 is coupled to an opposite face of the thermoplastic tubular structure 1504 as shown in FIG. 15. In other embodiments, the backing material, handling features, connection features, etc. are formed as a sleeve, and the thermoplastic tubular structure 1504 is inserted into (e.g., enclosed in) the sleeve at step 2108. In other embodiments, the thermoplastic tubular structure 1504 is integrated into a splinting device, for example to replace metal stays found in a conventional splinting device. In yet other embodiments, step 2108 is omitted and the splint 900 is composed of only the thermoplastic tubular structure 1504.

Referring now to FIG. 22, a flowchart of a process 2200 for using the kit 1500 is shown, according to an exemplary embodiment. The process 2200 facilitates the provision of negative pressure therapy and joint immobilization therapy to a patient.

At step 2202, a negative pressure dressing is applied to a patient's joint. For example, the dressing 100 can be applied around a patient's ankle or other joint. The dressing 100 can be sealed to the patient's skin to provide a substantially airtight volume between the dressing 100 and the skin as described elsewhere herein. Step 2202 can include coupling the negative pressure dressing to a negative pressure source. For example, the dressing 100 can be coupled to the connection pad 90 and the tubing 205, which is then connected to pump 200 to put the sealed volume between the dressing 100 and the skin in pneumatic communication with a negative pressure source.

At step 2204, a negative pressure source is operated to establish a negative pressure at the dressing. For example, air can be pumped out of the dressing 100 by the pump 200, exposing the patient's joint to a negative pressure. Negative pressure therapy of the joint is thereby initiated at step 2024.

At step 2206, the splint is heated to at least a first temperature. For example, the splint can be placed in hot water, heated in an oven, heated in a microwave, or otherwise exposed to thermal energy. The first temperature can correspond to a melting point of the thermoplastic polymer contain in the tubes of the tubular structure of the splint, for example. In various embodiments, the first temperature may be in a range between approximately 75 degrees Celsius and approximately 90 degrees Celsius. As a result of step 2206, the splint is in a moldable state.

At step 2208, the splint is conformed to the negative pressure dressing and the joint in a desired splinting form. For example, the splint can be applied in any of the various applications shown in FIGS. 9-14 and described with reference thereto above. Accordingly, step 2208 can including wrapping the splint around the joint and bending the splint to conform to the joint and the dressing. The splint can be applied such that a surface of the splint is abutting the dressing and substantially no gap is left between the splint and the dressing.

At step 2210, the heated splint (i.e., in a moldable state following step 2206) is held in the desired splinting form. For example, integrated attachment features of the dressing and/or a connection layer of the splint can be used to keep the heated splint in position. As another example, a separate wrap (e.g., flexible bandage) or tape (e.g., athletic tape) can be wrapped around the splint to secure the splint to the dressing and the joint while the splint is still in the heated/moldable state. The dressing can provide a thermal barrier between the splint and the patient's skin to protect the patient from discomfort that may otherwise be caused by the heat dissipating from the splint.

At step 2212, the splint is allowed to cool to become rigid. By holding the splint as in step 2210, the splint rigidifies in the desired splinting form, i.e., as applied in step 2208. Step 2212 includes allowing the splint to lose heat to the ambient environment over time. Step 2212 may also include applying ice or other cooling element to the splint to quickly cool the splint. At step 2212, the splint may cool to below a second temperature less than or equal to the first temperature and become rigid at the thermoplastic polymer inside the tubes of the tubular web or netting of the splint cools to a solid form. The splint may stay rigid below the second temperature, for example below approximately 50 or 60 degrees Celsius. Once the splint is rigid, the joint may be substantially immobilized.

At step 2214, the negative pressure source operates to provide negative pressure therapy while the splint stays rigid to provide joint immobilization. Under normal conditions, the splint is only exposed to temperatures below the second temperature and well below the first temperature, for example ambient air temperatures, ground temperatures, etc. The splint is thereby held indefinitely in its rigid form. Accordingly, process 2200 provides for the initiation and continued provision of negative pressure and immobilization therapy to a joint of a patient.

Referring now to FIG. 23, a process 2300 for adjusting or ending the immobilization therapy is shown, according to an exemplary embodiment. The process 2300 can follow the process 2200 of FIG. 22.

At step 2302, the splint is heated to at least the second temperature. To heat the splint while the splint is already coupled to a patient's joint, the splint can be exposed to a heating pad, massaged with a hot towel, exposed to hot air from a hair dryer or other electrical air-heating device, or otherwise provided with thermal energy in a targeted manner so as to avoid excessive heating of the patient's skin. When the splint is heated above the second temperature, the splint becomes at least partially flexible and bendable, although the splint may not be as fully moldable and conformable as when the splint is heated above the first, higher temperature as in step 2206 of process 2200. As a result of step 2302, the splint may be sufficiently moldable to be adjusted or removed from the dressing and the joint. In some embodiments, step 2302 includes targeting heat at particular sections of the splint which are desired to be adjusted or are key areas where flexibility would facilitate removal of the dressing. Such discrete areas may be heated to above the second temperature or the first temperature.

In some cases, at step 2304 the splint is reformed to adjust and immobilization functionality based on a change in swelling or other clinical adjustment. That is, the joint may change over time, for example reducing in size due to swelling reduction enhanced by the negative pressure therapy. As another example, the degree or type of immobilization which is determined to be beneficial by a clinician may change over time. Accordingly, at step 2304, the splint can be adjusted to adjust the immobilization without disrupting the negative pressure therapy.

At step 2306, following adjustment of the heated splint, the splint cools in the adjusted form to become rigid in the adjusted form. Adjusted immobilization therapy is thereby provided. This adjustability can be advantageous for healing.

In other cases, at step 2308 the splint is bent out of the desired splinting form and out of conformance with the dressing and the joint. This can include bending at one or more key points of the splint, e.g., a point at which the splint is wrapped around the joint in order to allow the joint to be removed from the joint. At step 2310, the splint can then be detached form the negative pressure dressing and the joint. This can include detaching attachment features of the dressing from the splint and/or connection features of the splint from the dressing, and/or removing any separate attachment tape or wrap that may have been used to help secure the splint in position.

The splint is thereby removed from the dressing. Immobilization therapy may end at this point, although the dressing 100 and the provision of negative pressure may restrict movement of the joint without the splint to a lesser degree (which may be therapeutically sufficient in some cases at some points of treatment). In some cases, process 2300 also includes releasing the negative pressure and removing the dressing from the joint.

At step 2312, the splint is cleaned and stored for reuse. For example, the splint may be washed in hot (e.g., boiling, near-boiling) water to both clean and sanitize the splint and to heat the splint in to a highly moldable form so the splint can be folded, rolled, or otherwise comprised into a relatively-small form for storage. The splint can then be stored for reuse. In some embodiments, for example where the dressing is applied over entirely intact skin, the dressing and/or other elements of the kit 1500 are also cleaned and stored for reuse at step 2312.

Heat-Activated Casting Tape

Figure 24:
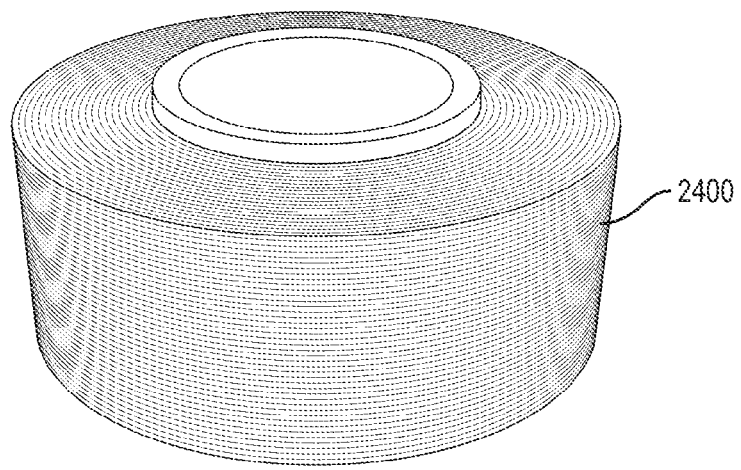
FIG. 24 is a perspective view of a roll of casting tape, according to an exemplary embodiment.

Referring now to FIG. 24, a casting tape 2400 is shown, according to an exemplary embodiment. The casting tape 2400 is configured to be flexible for application to a patient and to form self-adhering and rigid bonds between layers of the casting tape 2400 to for a rigid cast or splint. The casting tape 2400 can be heat-activated such that heating the casting tape 2400 (e.g., in hot water) causes the casting tape 2400 to become flexible to allow the casting tape 2400 to be wrapped and layered around a patient's joint, creates connections between adjacent layers of the casting tape 2400, and/or provides structural changes to the casting tape 2400 which enables the casting tape 2400 to provide immobilization of the joint.

FIG. 24 shows that the casting tape 2400 can be distributed in a roll. In some embodiments, the roll includes an amount of material associated with a single application so that a caregiver uses the entire roll of the casting tape 2400 when immobilizing a joint. In other embodiments, the roll of casting tape 2400 can include enough casting tape 2400 for multiple applications. The casting tape 2400 can be unrolled and cut to a desired length during or prior to application to the patient.

Figure 25:
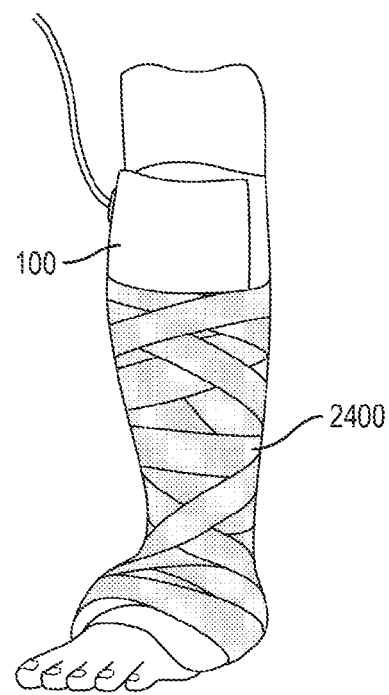
FIG. 25 is a perspective view of the casting tape of FIG. 24 applied to a joint of a patient with a negative pressure dressing, according to an exemplary embodiment.

Referring now to FIG. 25, an example application of the casting tape 2400 at a patient's joint is shown, according to an exemplary embodiment. As shown in FIG. 25, the casting tape 2400 is applied over and around the negative pressure dressing 100 to immobilize a patient's ankle. In particular, the casting tape 2400 can be heated and wrapped around the patient's ankle in multiple layers, for example helically up and down along and in different directions around the patient's ankle. The casting tape 2400 can also be applied in different directions consistent with ankle taping approaches used with conventional sports medicine materials (e.g., adhesive athletic tape), as may be familiar to caregivers. The casting tape 2400 can be applied such that several layers of the casting tape 2400 overlay key areas for immobilization of the joint, while one or two layers of the casting tape 2400 are provided in other areas where less rigidity is desired. FIG. 25 shows one of many possible example applications of the casting tape 2400 to a joint of a patient.

Figure 26:
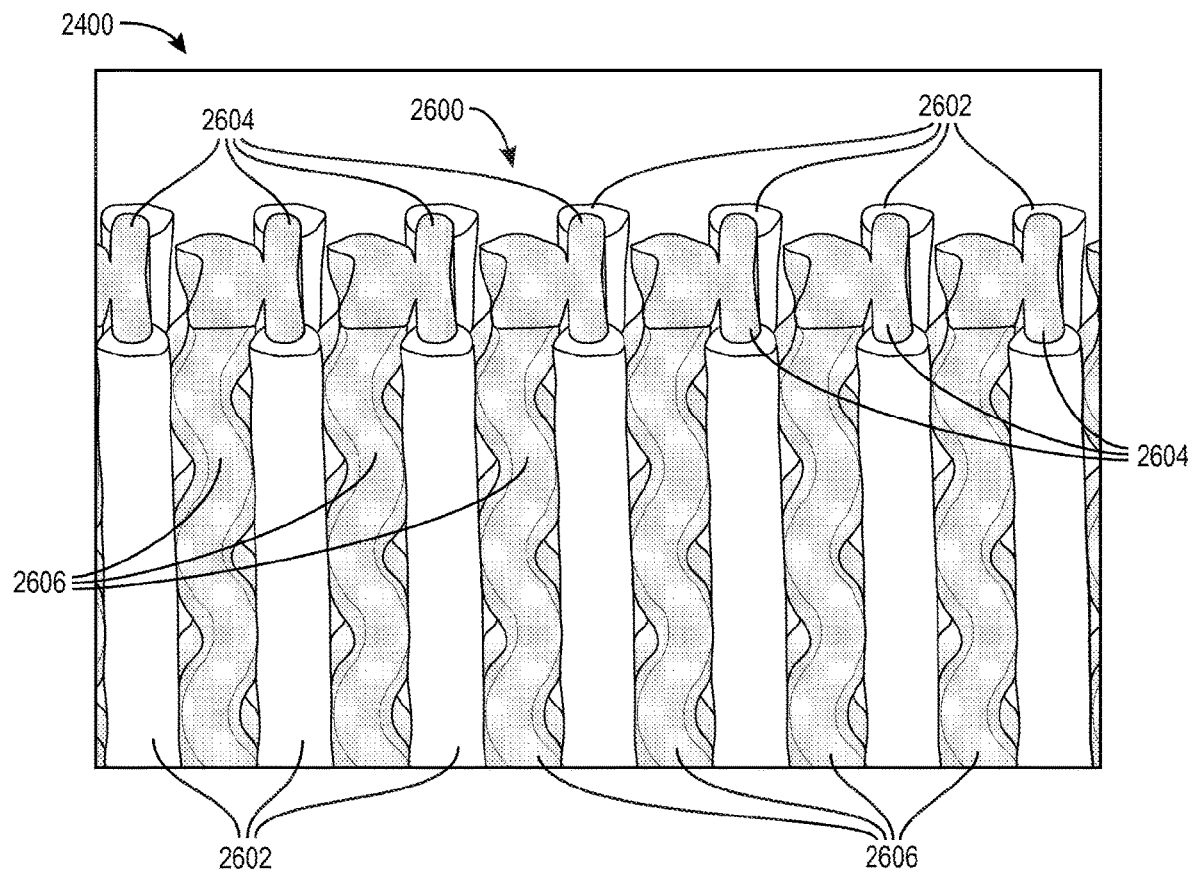
FIG. 26 is a close-up perspective view of the casting tape of FIG. 24, according to an exemplary embodiment.

The casting tape 2400 can be applied by heating the casting tape 2400. While at an increased temperature (e.g., above a threshold temperature) the casting tape 2400 is flexible and conformable, such that the casting tape 2400 can be wrapped and molded around a joint, for example into the arrangement shown in FIG. 25. The increased temperature can also activate the casting tape 2400 to form bonds and connections between adjacent layers of the casting tape 2400 which are in contact with one another. For example, as shown in FIG. 26 and described in detail with reference thereto, the casting tape 2400 may include an exposed polycaprolactone (PCL). In such an example, when heated above the threshold temperature the exposed PCL from one layer of the casting tape 2400 can join into, combine, mix, etc. with the exposed PCL from another layer of the casting tape 2400. As the casting tape 2400 is allowed to cool (e.g., to room temperature, below the threshold temperature), the combined/mixed PCL from adjacent layers of the casting tape 2400 rigidifies and bonds the adjacent layers together. This self-adhesion can hold the casting tape 2400 in position relative to the joint or other anatomy to which it is applied. Additionally, the cooling and rigidifying of the PCL from adjacent layers of the casting tape 2400 can provide the overall structure of the casting tape 2400 with a substantially rigid form which can substantially immobilize a patient's joint.

Referring now to FIG. 26, a close-up perspective view of a segment of the casting tape 2400 is shown, according to an exemplary embodiment. As shown in FIG. 26, the casting tape 2400 is includes a net 2600 formed of a first material and tips 2602 formed of a second material. The net 2600 is shown as being formed from alternating straight portions 2604 and wavy portions 2606 extending in shared direction along a length of the casting tape 2400. The wavy portions 2606 periodically connect with the straight portions 2604 such that wavy portions 2606 and the straight portions are coupled together to form the net 2600. For example, as shown in FIG. 26, each wavy portion 2606 alternately and repeatedly connects against two adjacent straight portions 2604. Gaps (openings, channels, spaces, etc.) are defined between the wavy portions 2606 and the straight portions 2604. In some embodiments, a material is extruded to form the net 2600. For example, the net 2600 can be formed of an elastomer. Accordingly, the net 2600 can be flexible, stretchable, and conformable. The net 2600 is also porous and breathable.

Various structures are possible for the net 2600. In some embodiments, for example, the net 2600 is formed according to the teachings of U.S. Pat. No. 10,501,877, granted Dec. 10, 2019 and/or U.S. Pat. No. 10,265,653, both of which are incorporated by reference herein in their entireties. For example, the netting shown at FIG. 2 of U.S. Pat. No. 10,501,877 can be combined with the configuration of ribbons and strands shown at FIG. 5 of U.S. Pat. No. 10,265,653 to provide greater strength to the net 2600.

The net 2600 also includes tips 2602 formed of a polymer such as polycaprolactone (PCL) with a lower melting point that the polymer of the net The tips 2602 are positioned on external surfaces of the net 2600, such that the tips 2602 are exposed. In the example shown, the tips 2602 extend along the straight portions 2604 of the net 2600 and can extend along an entirety of the length of the casting tape 2400. Each straight portion 2604 corresponds to two tips 2602 on opposing edges of the straight portion 2604, i.e., opposing sides of the net 2600. The tips 2602 can be coextruded with the net 2600 such that the net 2600 and the tips 2602 are formed together to create the casting tape 2400.

The casting tape 2400 can be provided in various dimensions in various embodiments. For example, the thickness of the casting tape 2400 may be approximately one millimeter or less than one millimeter. The tips 2602 may be spaced apart by approximately one millimeter, and the straight portions 2604 can be spaced apart by approximately one millimeter. The width of the tips and the straight portions 2604 may be approximately one-third millimeter. The wavy portions 2606 can be sized accordingly. Any number of wavy portions 2606 and straight portions 2604 can be provided in order to provide the casting tape 2400 with a desired overall width. For example, the width may be between 4 and 20 centimeters in various embodiments.

The tips 2602 have a lower melting or softening point than the net 2600. At room temperature (e.g., less than approximately 40 C) the tips 2602 can be at least partially rigid, and may be foamed in some embodiments. When heated above a threshold temperature (e.g., above 40 C, above 50 C, above 60 C) the tips 2602 soften or melt, while the net 2600 substantially maintains its material properties (i.e., does not soften or melt unless at a much higher temperature). Accordingly, when the casting tape 2400 is heated above the threshold temperature, the casting tape 2400 can be easily wrapped, conformed, molded, etc. around a patient's joint in a desired casting or splinting configuration.

Additionally, when the casting tape 2400 is overlapped on itself at this higher temperature, the tips 2602 from a first layer of the casting tape 2400 abut the tips 2602 from a second layer of the casting tape 2400. The abutting tips 2602 are soft or melted and therefore can combine, mix, etc. to reform as a unified section of the PCL material of the tips 2602. Depending on the arrangement of the casting tape 2400, the abutting tips 2602 can form a grid or other crisscrossed pattern of tips 2602 which intersect and are combined with one another.

As the casting tape 2400 is allowed to cool (e.g., return to room temperature through heat loss to ambient air, exposed to ice or other cooling source) the reformed and combined pattern or the PCL material from the tips 2602 rigidifies to form a substantially rigid structure. The rigid structure is highly customizable, as the casting tape 2400 can be applied in a wide variety of applications as desired by a caregiver. The tips 2602 can also be reformed when soft to at least partially fill gaps between the wavy portions 2606 and straight portions 2604 of the net 2600, which can increase the rigidity of the casting tape 2400 as the PCL material hardens.

When in the roll form shown in FIG. 24, the cast tape 2400 can be heated to a threshold temperature, e.g., 65 C, to melt the PCL and facilitate unrolling. To allow the cast tape 2400 be easy to unwind, the cast tape 2400 can be configured such that the PCL bond between layers only form once the layers are applied and pressure is applied to mold the cast to a patient's extremity. Accordingly, in some embodiments the structure of cast tape 2400 limits the amount of exposed PCL, e.g., reducing or eliminating overlap between PCLs when rolled up as in FIG. 24. As another example, a lubricant may be included in the PCL tips 2602. As another example, the cast tape 2400 is distributed with a lubricant on one or more surfaces of the cast tape 2400, e.g., between layers of the roll shown in FIG. 24. The lubricant may activated by water such that heating the cast tape 2400 above the melting point of the PCL (e.g., 65 C) in a hot water bath releases the lubricant and facilitates movement of layers of the cast tape 2400 relative to one another. For example, a thermoplastic polyvinyl alcohol (e.g., Mowiflex TC232) can be added directly to the PCL to function as a lubricant when added at 5-30%, preferably 10-20%, by weight. This can be achieved by dry-blending pellets of CAPA 6800 PCL and Mowiflex TC 232 before extrusion to form the cast tape 2400. Other water soluble or dispersable polymers and surfactants as well as combinations thereof may be useful as well. Various combinations of these approaches are within the scope of the present application.

The casting tape 2400 thereby provides for self-adhering immobilization of a joint. The casting tape 2400 is also adapted to be applied over a negative pressure wound dressing 100, for example as shown in FIG. 25. The casting tape 2400 provides a high degree of customizability in application which allows the casting tape 2400 to accommodate features of the dressing 100 without compromising the effectiveness of the immobilization. For example, the casting tape 2400 can be applied so as to not block a path for the connection pad and tube to extend from the negative pressure dressing 100 to a negative pressure source (e.g., pump). As another example, the negative pressure wound dressing 100 can be provided with PCL regions on an external surface of the negative pressure wound dressing 100 such that the tips 2602 can merge with the PCL of the dressing 100 in order to adhere to the dressing 100. Various structures can be provided on the dressing 100 to facilitate connection between the dressing 100 and the casting tape 2400, consistent with other embodiments described above.

The casting tape 2400 can be removed by cutting the casting tape 2400 off of the joint, with a scissors, blade, athletic tape cutter tool, etc. The casting tape 2400 can also be removed by reheating the casting tape 2400 to above a threshold temperature, thereby softening or melting the PCL material to release the self-adherence between layers of the casting tape 2400. The casting tape 2400 can then be unwound from the patient. The casting tape 2400 can thus be easily applied and removed from a joint to provide immobilization therapy as may be desirable to facilitate wound healing.

CONFIGURATION OF EXEMPLARY EMBODIMENTS

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary," and variations thereof (e.g., "illustrative"), as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A splint, comprising:
   a plurality of flexible tubes formed of a first material, wherein the plurality of flexible tubes are coupled together to form a web;
   a second material positioned in the flexible tubes and having a lower thermal softening point than the first material;
   wherein:
      the web is conformable when the second material is heated to a temperature above the thermal softening point of the second material; and
      the web is rigid when a temperature of the second material is below the thermal softening point of the second material.

2. The splint of claim 1, wherein the first material is a first thermoplastic polymer and the second material is a second thermoplastic polymer.

3. The splint of claim 1, wherein the second material comprises polycaprolactone.

4. The splint of claim 1, further comprising a backing layer coupled to the web.

5. The splint of claim 1, further comprising connection features coupled to the splint, wherein the connection features are configured to couple the splint to a dressing.

6. The splint of claim 1, wherein the web further comprises spacer segments between adjacent tubes of the plurality of flexible tubes.

7. The splint of claim 1, wherein the flexible tubes are in two or more planes.

8. The splint of claim 1, wherein the flexible tubes are aligned in a shared plane.

9. The splint of claim 1, wherein a cross-section of each of the flexible tubes has a non-circular shape.

10. The splint of claim 1, wherein adjacent tubes of the plurality of flexible tubes are periodically joined together at bond regions with spaces between the adjacent tubes of the plurality of flexible tubes between the bond regions.

11. A kit for negative pressure and immobilization therapy, comprising:
- a negative pressure dressing configured to define a sealed volume between a patient's skin and the negative pressure dressing when applied to the patient;
- a pump configured to be placed in pneumatic communication with the negative pressure dressing and operable to displace air from the sealed volume;
- a heat-moldable splint comprising:
  - a plurality of flexible tubes formed of a first material and coupled together to form a web;
  - a second material positioned in the flexible tubes and having a lower softening or melting point than the first material.

12. The kit of claim 11, wherein adjacent tubes in the web of the plurality of flexible tubes are periodically bonded together at bond regions and spaced apart between the bond regions.

13. The kit of claim 11, wherein the heat-moldable splint further comprises spacer segments joining adjacent tubes of the plurality of flexible tubes to form the web.

14. The kit of claim 11, wherein the negative pressure dressing comprises attachment features configured to selectively couple the heat-moldable splint to the negative pressure dressing.

15. The kit of claim 14, wherein the heat-moldable splint comprises a connection layer coupled to the web and configured to be coupled to the attachment features of the negative pressure dressing.

16. The kit of claim 11, wherein:
- the negative pressure dressing is shaped to be applied to a patient's ankle;
- the heat-moldable splint is configured to be heated into a moldable state to facilitate application of the heat-moldable splint over the negative pressure dressing at the patient's ankle; and
- the heat-moldable splint is configured to cool to a rigid state to provide immobilization of the patient's ankle when the heat-moldable splint is applied over the negative pressure dressing at the patient's ankle.

17. A method of providing negative pressure and immobilization therapy to facilitate joint healing, comprising:
- sealing a negative pressure dressing over intact skin;
- operating a pump coupled to the negative pressure dressing to establish a negative pressure between the negative pressure dressing and the intact skin;
- heating a heat-moldable splint to at least a softening point of a material housed inside flexible tubes of the heat-moldable splint;
- conforming the heat-moldable splint over the dressing and into a desired splinting configuration; and
- allowing the heat-moldable splint to rigidify in the desired splinting configuration as the heat-moldable splint cools to an ambient temperature.

18. The method of claim 17, wherein conforming the heat-moldable splint into the desired splinting configuration comprises spiraling the heat-moldable splint around and along the dressing.

19. The method of claim 17, wherein allowing the heat-moldable splint to rigidify in the desired splinting configuration comprises coupling the heat-moldable splint to the dressing in the desired splinting configuration, and wherein coupling the heat-moldable splint to the dressing in the desired splinting configuration comprises applying an attachment feature of the dressing to a connection layer of the heat-moldable splint.

20. The method of claim 17, further comprising removing the heat-moldable splint from the dressing by heating at least a portion of the heat-moldable splint and bending the heat-moldable splint at the dressing to separate the heat-moldable splint from the dressing.

* * * * *